United States Patent
Wu et al.

(10) Patent No.: US 8,504,670 B2
(45) Date of Patent: Aug. 6, 2013

(54) VIRTUALIZED DATA STORAGE APPLICATIONS AND OPTIMIZATIONS

(75) Inventors: David Tze-Si Wu, Fremont, CA (US); Steven McCanne, Berkeley, CA (US); Michael J. Demmer, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 476 days.

(21) Appl. No.: 12/818,872

(22) Filed: Jun. 18, 2010

(65) Prior Publication Data

US 2011/0238775 A1  Sep. 29, 2011

Related U.S. Application Data

(63) Continuation-in-part of application No. 12/730,179, filed on Mar. 23, 2010.

(51) Int. Cl.
    *G06F 15/173* (2006.01)
(52) U.S. Cl.
    USPC .......................................... 709/223; 709/213
(58) Field of Classification Search
    USPC .................................. 709/201–213, 217, 223
    See application file for complete search history.

(56) References Cited

U.S. PATENT DOCUMENTS

| | | | | |
|---|---|---|---|---|
| 7,707,185 B1 * | 4/2010 | Czezatke et al. | ............... | 707/649 |
| 7,831,682 B2 * | 11/2010 | Certain et al. | ................. | 709/214 |
| 8,015,343 B2 * | 9/2011 | Garman et al. | ................ | 711/100 |
| 8,019,732 B2 * | 9/2011 | Paterson-Jones et al. | .... | 707/674 |
| 8,032,689 B2 * | 10/2011 | Kulkarni | ............................ | 711/6 |
| 8,051,141 B2 * | 11/2011 | Dutta et al. | .................... | 709/217 |
| 8,151,033 B2 * | 4/2012 | Dake | ................................. | 711/6 |
| 8,255,630 B1 * | 8/2012 | Bali et al. | ........................ | 711/133 |
| 8,312,175 B2 * | 11/2012 | Patale et al. | ........................ | 710/1 |
| 8,312,471 B2 * | 11/2012 | Davis | .............................. | 719/312 |
| 8,364,638 B2 * | 1/2013 | Nickolov et al. | ............. | 707/636 |
| 2002/0165942 A1 * | 11/2002 | Ulrich et al. | ................... | 709/219 |
| 2006/0064536 A1 * | 3/2006 | Tinker et al. | ................... | 711/100 |
| 2006/0212539 A1 * | 9/2006 | Palevich et al. | ............... | 709/217 |
| 2008/0140937 A1 | 6/2008 | Nalawade et al. | | |
| 2010/0125730 A1 * | 5/2010 | Dodgson et al. | ............. | 713/153 |
| 2010/0241654 A1 * | 9/2010 | Wu et al. | ........................ | 707/769 |
| 2010/0241726 A1 * | 9/2010 | Wu | ............................... | 709/217 |
| 2010/0241807 A1 * | 9/2010 | Wu et al. | ........................ | 711/118 |
| 2010/0257219 A1 * | 10/2010 | Patel et al. | ..................... | 707/827 |

OTHER PUBLICATIONS

Sivathanu, Gopalan, "End-to-End Abstractions for Application-Aware Storage", The Graduate School Stony Brook University, May 2008, Stony Brook, NY.

* cited by examiner

*Primary Examiner* — Sargon Nano
(74) *Attorney, Agent, or Firm* — Park, Vaughan, Fleming & Dowler, LLP

(57) ABSTRACT

Virtual storage arrays consolidate branch data storage at data centers connected via wide area networks. Virtual storage arrays appear to storage clients as local data storage, but actually store data at the data center. Virtual storage arrays may prioritize storage client and prefetching requests for communication over the WAN and/or SAN based on their associated clients, servers, storage clients, and/or applications. A virtual storage array may transfer large data sets from a data center to a branch location while providing branch location users with immediate access to the data set stored at the data center. Virtual storage arrays may be migrated by disabling a virtual storage array interface at a first branch location and then configuring another branch virtual storage array interface at a second branch location to provide its storage clients with access to storage array data stored at the data center.

12 Claims, 13 Drawing Sheets

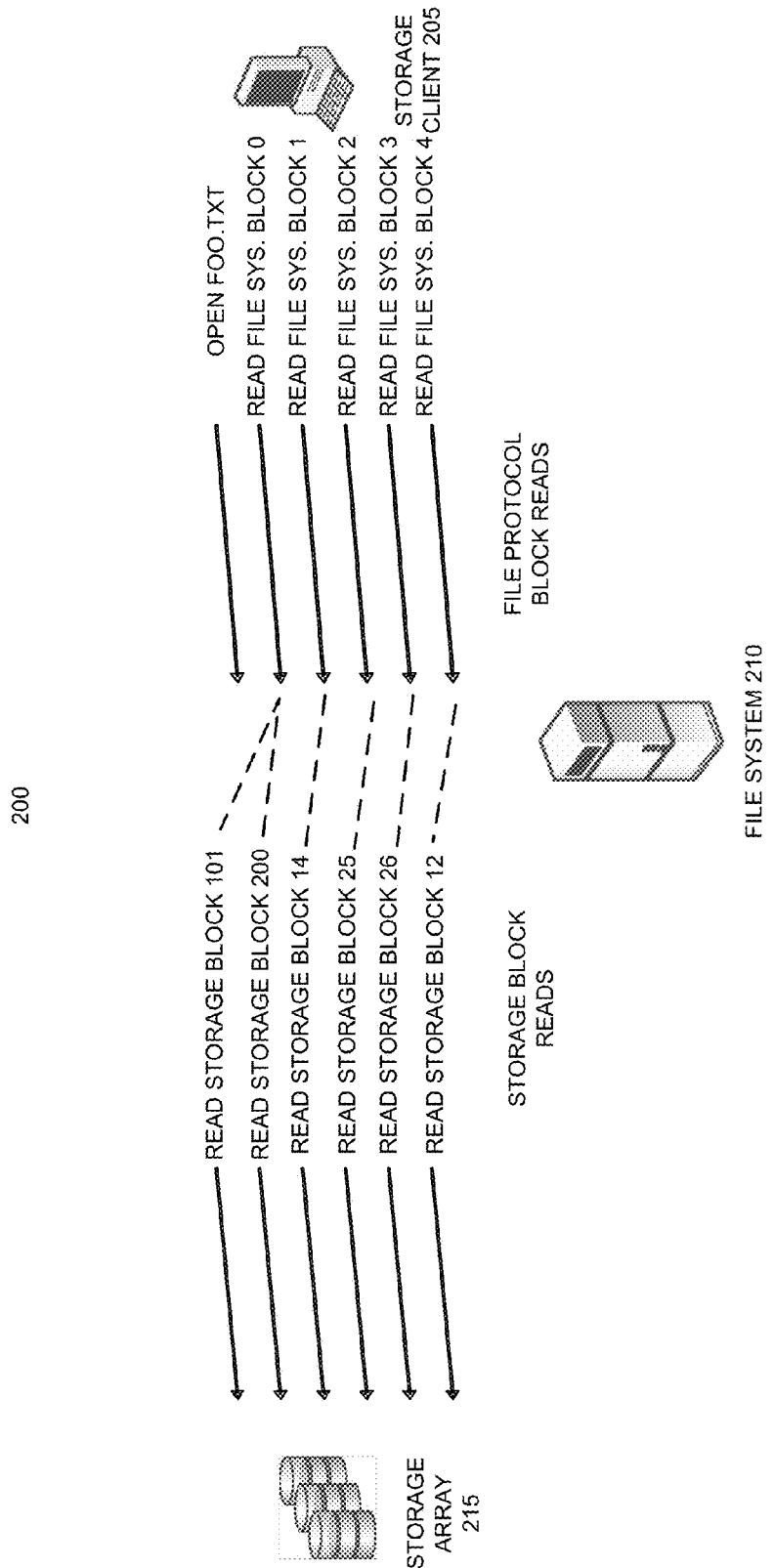

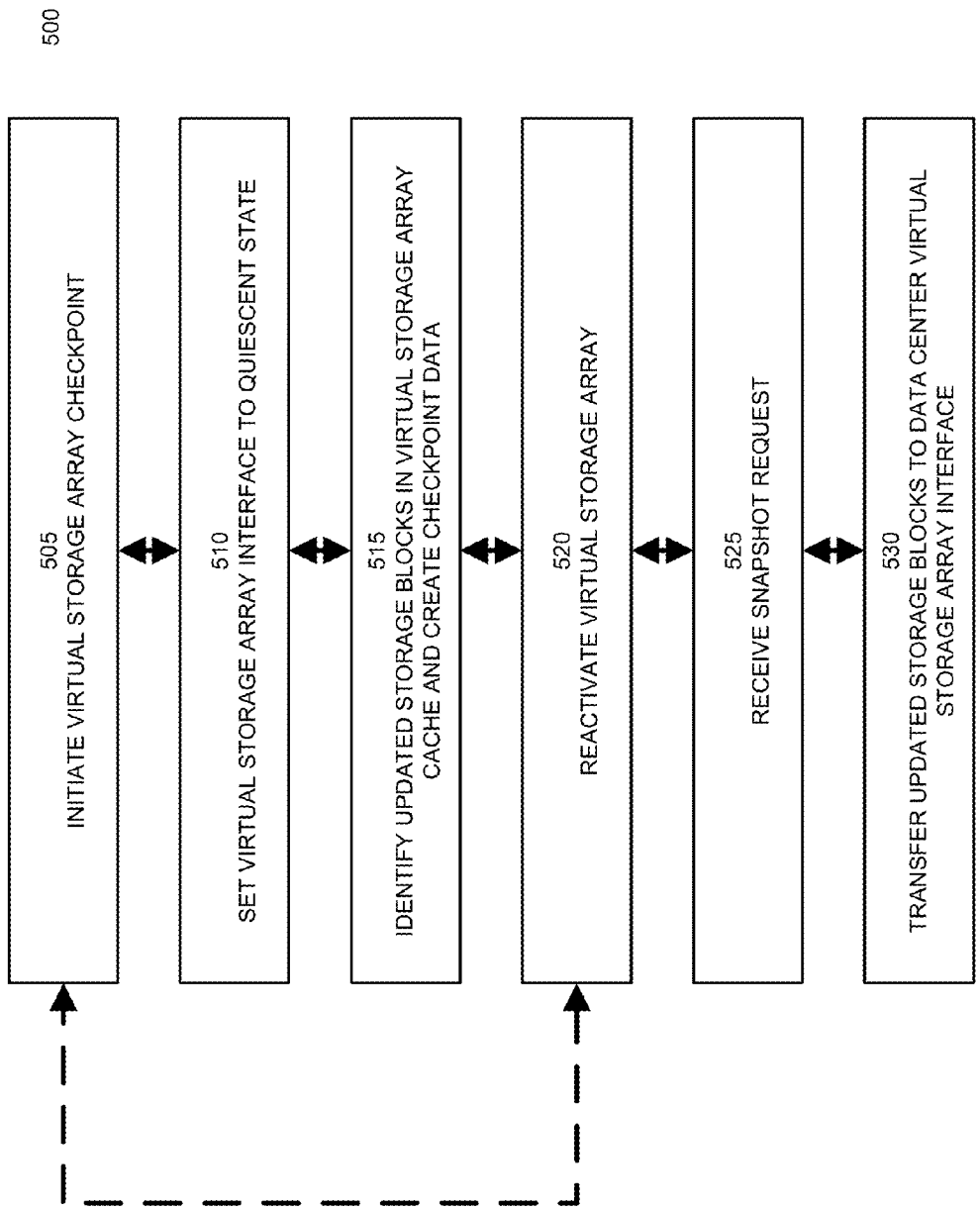

VIRTUALIZED DATA STORAGE APPLICATIONS AND OPTIMIZATIONS

CROSS-REFERENCE TO RELATED APPLICATIONS

This application is related to U.S. patent application Ser. No. 12/730,185, entitled "Virtualized Data Storage System Architecture", filed Mar. 23, 2010; U.S. patent application Ser. No. 12/730,192, entitled "Virtualized Data Storage Cache Management", filed Mar. 23, 2010; and U.S. patent application Ser. No. 12/730,198, entitled "Virtual Data Storage System Optimizations", filed Mar. 23, 2010; all of which are incorporated by reference herein for all purposes. This application is a continuation in part of U.S. patent application Ser. No. 12/730,179, entitled "Virtualized Data Storage Over Wide-Area Networks," filed Mar. 23, 2010.

BACKGROUND

The present invention relates generally to data storage systems, and systems and methods to improve storage efficiency, compactness, performance, reliability, and compatibility. In computing, a file system specifies an arrangement for storing, retrieving, and organizing data files or other types of data on data storage devices, such as hard disk devices. A file system may include functionality for maintaining the physical location or address of data on a data storage device and for providing access to data files from local or remote users or applications.

Typically, data storage for multiple users and applications in an enterprise is implemented using a file server attached to one or more client systems and application servers via a local area network (LAN). The file server allows users and applications to access data via file-based network protocols, such as NFS or SMB/CIFS.

Many physical storage devices, such as hard disk drives, are too small, too slow, and too unreliable for enterprise storage operations. As a result, many file servers are connected with large numbers of remote data storage devices, such as disk arrays, tape libraries, and optical drive jukeboxes, via a storage area network (SAN). A storage area network appears to file and application servers as one or more locally attached storage devices. Storage area networks use protocols such as iSCSI and Fibre Channel Protocol to communicate with storage clients. These storage area network protocols are based on reading and writing blocks of data to storage devices and typically operate below the level of the file system.

Large organizations, such as enterprises, are often geographically spread out over many separate locations, referred to as branches. For example, an enterprise may have offices or branches in New York, San Francisco, and India. Each branch location may include its own internal local area network for exchanging data within the branch. Additionally, the branches may be connected via a wide area network, such as the internet, for exchanging data between branches.

Typical branch LAN installations also required data storage for their local client systems and application servers. For example, a typical branch LAN installation may include a file server for storing data for the client systems and application services. In prior systems, this branch's data storage is located at the branch site and connected directly with the branch LAN. Thus, each branch requires its own file server and associated data storage devices.

Deploying and maintaining file servers and data storage at a number of different branches is expensive and inefficient. Organizations often require on-site personnel at each branch to configure and upgrade each branch's data storage, and to manage data backups and data retention. Additionally, organizations often purchase excess storage capacity for each branch to allow for upgrades and growing data storage requirements. Because branches are serviced infrequently, due to their numbers and geographic dispersion, organizations often deploy enough data storage at each branch to allow for months or years of storage growth. However, this excess storage capacity often sits unused for months or years until it is needed, unnecessarily driving up costs.

Previously, some types information technology infrastructure, such as application servers, from multiple branches has been consolidated to one or a small number of centralized data centers. These centralized data centers are connected with multiple branches via a wide area network, such as the internet. This consolidation of information technology infrastructure decreases costs and improves management efficiency. However, branch data storage is rarely consolidated at a remote data center, because the intervening WAN is slow and has high latency, making storage accesses unacceptably slow for client systems and application servers. Thus, organizations have previously been unable to consolidate data storage from multiple branches.

BRIEF DESCRIPTION OF THE DRAWINGS

The invention will be described with reference to the drawings, in which:

FIGS. 2A-2B illustrate a method of optimizing data reads in a virtual storage array system according to an embodiment of the invention;

FIG. 5 illustrates a method of creating data snapshots of a virtual storage array according to an embodiment of the invention;

SUMMARY

Figure 1A:
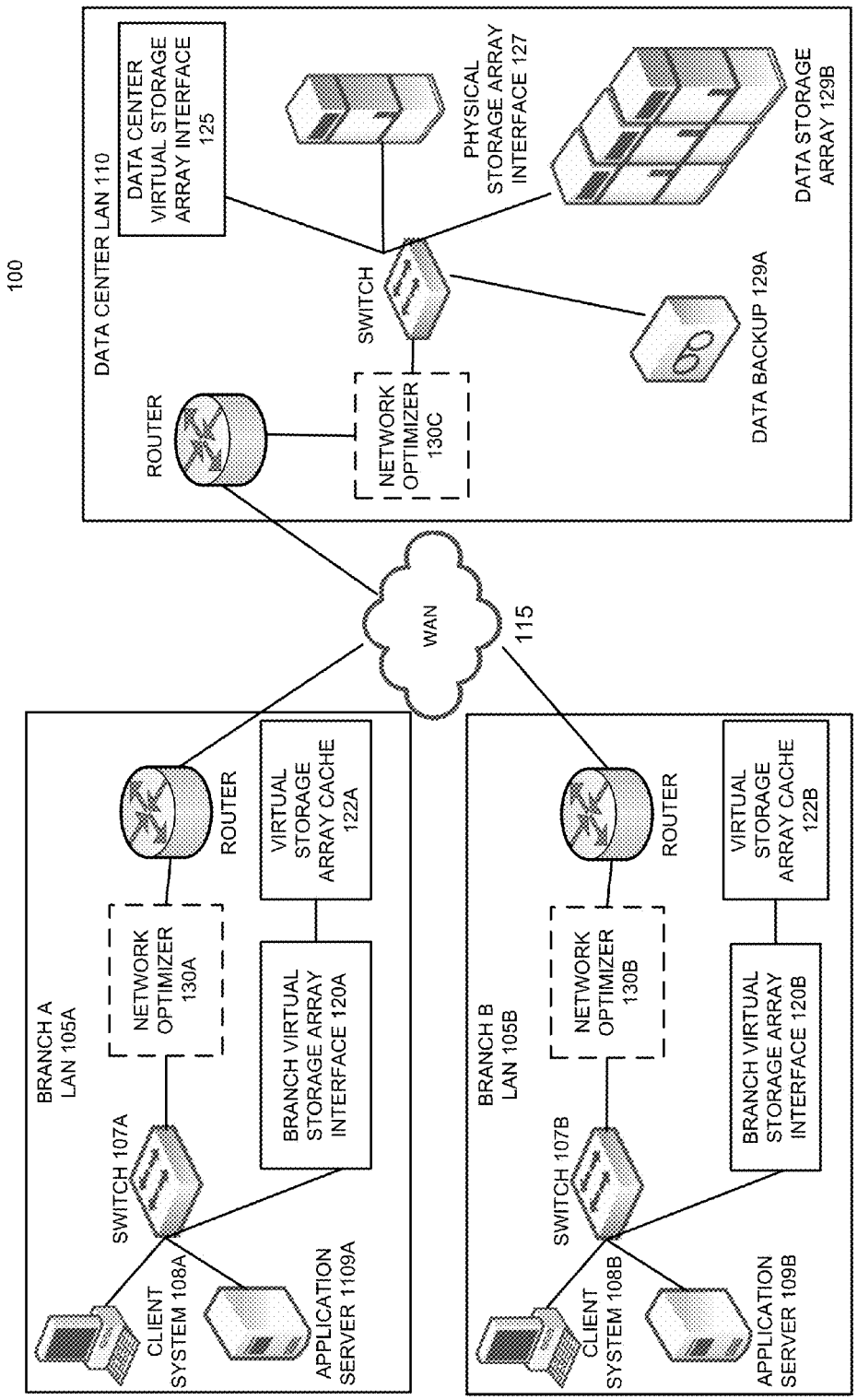
FIGS. 1A-1B illustrates virtual storage array system according to an embodiment of the invention.

An embodiment of the invention uses virtual storage arrays to consolidate branch location-specific data storage at data centers connected with branch locations via wide area networks. The virtual storage array appears to a storage client as a local branch data storage; however, embodiments of the invention actually store the virtual storage array data at a data center connected with the branch location via a wide-area network. In embodiments of the invention, a branch storage client accesses the virtual storage array using storage block based protocols to specify reads, writes, modifications, and/or deletions of storage blocks.

Embodiments of the invention overcome the bandwidth and latency limitations of the wide area network between branch locations and the data center by predicting storage blocks likely to be requested in the future by the branch storage client and prefetching and caching these predicted storage blocks at the branch location. When this prediction is successful, storage block requests from the branch storage client may be fulfilled in whole or in part from the branch location's storage block cache. As a result, the latency and bandwidth restrictions of the wide-area network are hidden from the storage client.

Embodiments of the invention may include quality of service (QoS) features for enhancing the performance of the virtual storage array. One example QoS feature prioritizes storage block requests from the storage client ahead of storage requests for prefetched storage blocks for communication over the WAN and/or SAN. A further example QoS feature may prioritize storage requests for communication over the WAN and/or SAN according to their associated client and server systems, storage clients, and/or applications. Another example QoS feature may ignore or omit different types of storage block prefetching when the amount of network traffic between the branch and data center locations over the WAN and/or SAN exceeds a threshold. Embodiments of the invention may utilize multiple WAN and/or SAN connections to segregate network and storage traffic and improve performance.

An embodiment of the invention may be used to communicate large amounts of data from a data center to a branch location. In this embodiment, a virtual storage array provides branch location users with immediate access to the data set stored at the data center. This access is provided by accessing and prefetching storage blocks over the WAN from the data center. Storage blocks retrieved from the data center in this manner are cached and/or copied to data storage at the branch location. Additionally, remaining portions of the data set at the data center are transferred in the background over the WAN to the branch location for storage. Updated storage blocks are transferred from the branch location to the data center for data backup and snapshots.

An embodiment of the invention enables data to migrate between multiple branch locations. In this embodiment, a first branch virtual storage array interface at a first branch location provides storage clients at that branch location with access to storage array data stored at the data center. To migrate the virtual storage array, the first branch virtual storage array interface disables storage client access to the virtual storage array. Any updated storage blocks cached at the branch location are transferred back to the data center to update the storage array data. A second branch virtual storage array interface at a second branch location is configured to provide storage clients at that branch location with access to storage array data stored at the data center.

DETAILED DESCRIPTION OF ILLUSTRATIVE EMBODIMENTS

Figure 1B:
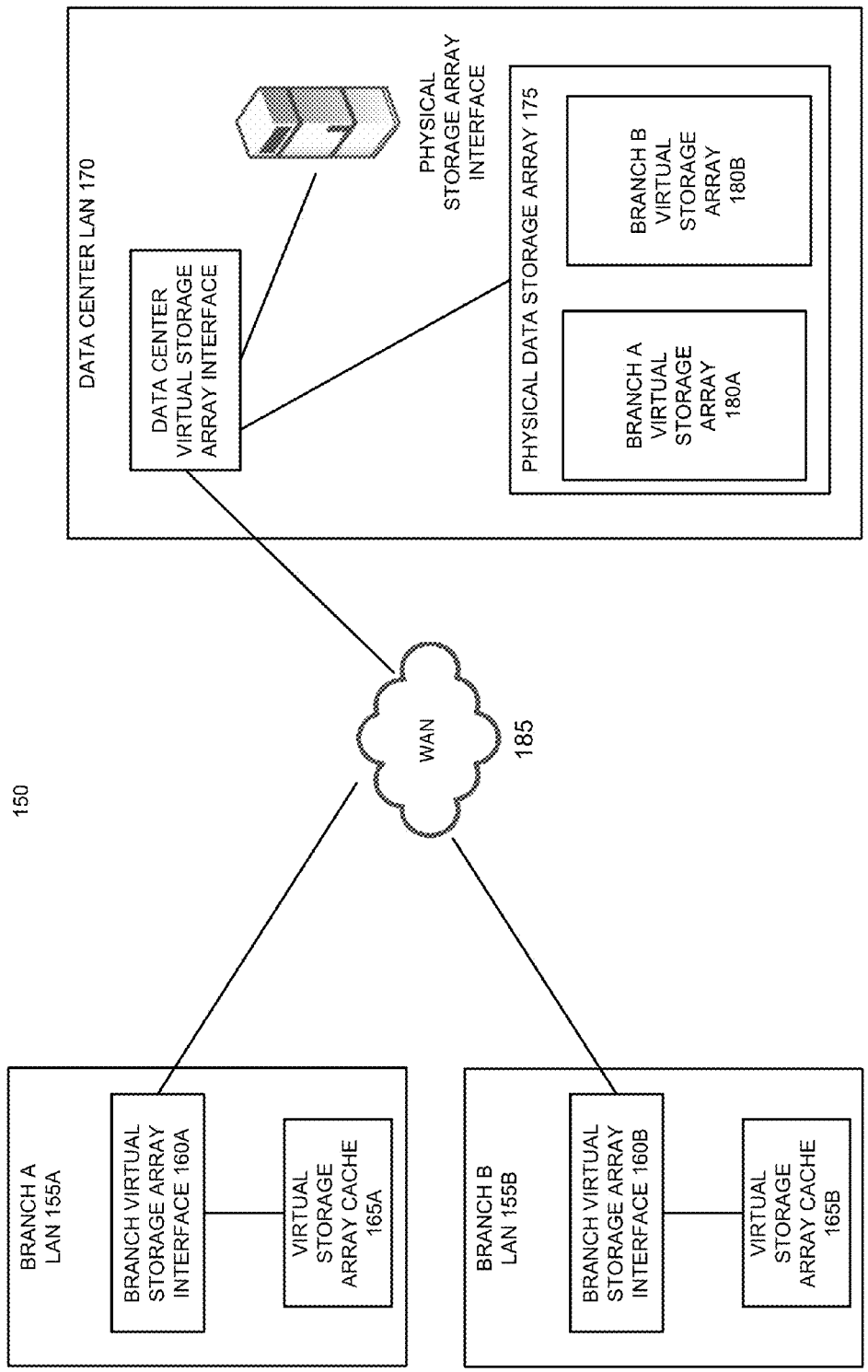

FIGS. 1A-1B illustrates virtual storage array systems according to an embodiment of the invention. FIG. 1A illustrates an example system 100 including virtual storage arrays according to an embodiment of an invention. The example system 100 includes two branches 105*a* and 105*b*, each of which has its own internal local area network (LAN), and a data center 110, which also includes its own LAN. The two branch networks 105 and the data center network 110 are connected by one or more wide area networks (WANs) 115, such as the internet. Although FIG. 1A shows two branches and one data center, embodiments of the invention can be implemented with any arbitrary number of branches and data centers.

Each of the branch LANs 105 may include routers, switches, and other wired or wireless network devices 107 for connecting with client systems and other devices, such as network devices 107*a* and 107*b*. For example, each of the branch LANs 105 may connect one or more client systems 108, such as client system 108*a* and 108*b*, with one or more application servers 109, such as 109*a* and 109*b*. Application servers 109 provide applications and application functionality to the client systems 108.

Previously, typical branch LAN installations also requires data storage for client systems and application servers. For example, a prior typical branch LAN installation may include a file server for storing data for the client systems and application servers, such as database servers and e-mail servers. In prior systems, this branch's data storage is located at the branch site and connected directly with the branch LAN. The branch data storage previously could not be located at the data center, because the intervening WAN is too slow and has high latency, making storage accesses unacceptably slow for client systems and application servers.

An embodiment of the invention allows for storage consolidation of branch-specific data storage at data centers connected with branches via wide area networks. This embodiment of the invention overcomes the bandwidth and latency limitations of the wide area network between branches and the data center. To this end, an embodiment of the invention includes virtual storage arrays.

A virtual storage array appears to branch users, such as branch client systems and branch application servers, as a storage array connected with the branch's local area network. A virtual storage array can be used for the same purposes as a local storage area network or other data storage device. For example, a virtual storage array may be used in conjunction with a file server for general-purpose data storage, in conjunction with a database server for database application storage, or in conjunction with an e-mail server for e-mail storage. However, the virtual storage array stores its data at a data center connected with the branch via a wide area network. Multiple separate virtual storage arrays, from different branches, may store their data in the same data center and, as described below, on the same storage devices.

Because the data storage of multiple branches is consolidated at a data center, the efficiency, reliability, cost-effectiveness, and performance of data storage is improved. An organization can manage and control access to their data storage at a central data center, rather than at large numbers of separate branches. This increases the reliability and performance of an organization's data storage. This also reduces the personnel required at branch offices to provision, maintain, and backup data storage. It also enables organizations to implement more effective backup systems, data snapshots, and disaster recovery for their data storage. Furthermore, organizations can plan for storage growth more efficiently, by consolidating their storage expansion for multiple branches and reducing the amount of excess unused storage. Additionally, an organization can apply optimizations such as compression or data deduplication over the data from multiple branches stored at the data center, reducing the total amount of storage required by the organization.

In an embodiment, virtual storage arrays are implemented at each of the branches 105 using branch virtual storage array interfaces 120, such as branch virtual storage array interfaces 120a and 120b. Any of the branch virtual storage array interfaces 120 may be a stand-alone computer system or network appliance or built into other computer systems or network equipment as hardware and/or software. In a further embodiment, any of the branch virtual storage array interfaces 120 may be implemented as a software application or other executable code running on a client system or application server.

In an embodiment, each of the branch virtual storage array interfaces 120 includes one or more storage array network interfaces and supports one or more storage array network protocols to connect with client systems and/or application servers within a branch local area network. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. In cases where the storage array network interface uses Ethernet, an embodiment of the branch virtual storage array interface 120 can use the branch LAN's physical connections and networking equipment for communicating with client systems and application services. In other embodiments, separate connections and networking equipment, such as Fibre Channel networking equipment, is used to connect the branch virtual storage array interface 120 with client systems 108 and/or application servers 109.

In an embodiment, one or more of the branch LANs 105 can include a file server, for example built into one of the application servers 109, for providing a network file interface to the virtual storage array to client systems 108 and other application servers 109. In a further embodiment, the branch virtual storage array interface 120 is integrated as hardware and/or software with an application server 109, such as a file server, database server, or e-mail server. In this embodiment, the branch virtual storage array interface 120 can include application server interfaces, such as a network file interface, for interfacing with other application servers and/or client systems.

From the view of application servers 109 and client systems 108, a branch virtual storage array interface 120 appears to be a local storage array, having its data storage at the associated branch 105. For example, branch virtual storage array 120a appears to clients 108a and application server 109a as a local data storage array on branch LAN 105a. However, the branch virtual storage array interfaces 120 actually store and retrieve data from storage devices located on the data center LAN 110. Because virtual storage array data accesses must travel via the WAN 115 between the data center LAN 110 to the branch LANs 105, the virtual storage arrays are subject to the latency and bandwidth restrictions of the WAN 115.

In an embodiment, the branch virtual storage array interfaces 120 includes virtual storage array caches 122, such as virtual storage array caches 122a and 122b for virtual storage array interfaces 120a and 120b respectively, which are used to ameliorate the effects of the WAN 115 on virtual storage array performance. As described in detail below, virtual storage array data accesses, including data reads and data writes, can be optimized to minimize the effect of WAN bandwidth restrictions and latency.

Additionally, an embodiment of the invention includes a data center virtual storage array interface 125 located on the data center LAN 110. In an embodiment, the data center virtual storage array interface 125 communicates with one or more branch virtual storage interfaces 120 via the data center LAN 110, the WAN 115, and their respective branch LANs 105. Data communications between virtual storage interfaces 120 and 125 can be in any form and/or protocol used for carrying data over wired and wireless data communications networks, including TCP/IP.

The data center virtual storage array interface 125 translates data communications from branch virtual storage array interfaces 120 into storage accesses of a physical storage array network. To this end, an embodiment of a data center virtual storage array interface 125 accesses a physical storage array network interface 127, which in turn accesses physical data storage devices 129 on a storage array network. Examples of data storage devices 129 include physical data storage array devices 129a and data backup devices 129b. In another embodiment, the data center virtual storage array interface 125 includes one or more storage array network interfaces and supports one or more storage array network protocols for directly connecting with a physical storage array network and its data storage devices 129. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. Embodiments of the data center virtual storage array interface 125 may connect with the physical storage array interface 127 and/or directly with the physical storage array network using the Ethernet network of the data center LAN and/or separate data communications connections, such as a Fibre Channel network.

In a further embodiment, branch 105 and data center LANs 110 may optionally include network optimizers 130 for improving the performance of data communications over the WAN 115 between branches and/or the data center. Network optimizers 130 can improve actual and perceived WAN network performance using techniques including compressing data communications; anticipating and prefetching data; caching frequently accessed data; shaping and restricting network traffic; and optimizing usage of network protocols. In an embodiment, network optimizers 130 may be used in conjunction with virtual storage array interfaces 120 and 125 to further improve virtual storage array performance accessing data via the WAN 115. In other embodiments, network optimizers 130 may ignore or pass-through virtual storage array data traffic, relying on the virtual storage array interfaces 120 and 125 on the branch 105 and data center LANs 110 to optimize WAN performance.

Further embodiments of the invention may be used in different network architectures. For example, a data center virtual storage array interface may be connected directly between a WAN and a physical data storage array, eliminating the need for a data center LAN. Similarly, a branch virtual storage array interface, implemented for example in the form of a software application executed by a storage client computer system, may be connected directly with a WAN, such as the internet, eliminating the need for a branch LAN.

FIG. 1B illustrates an example arrangement 150 of data within virtual and physical storage array networks according to an embodiment of the invention. In this example 150, two branches 155a and 155b each include a branch virtual storage array interface 160a and 160b and associated virtual storage array cache 165a and 165b, respectively. As discussed in detail below, each of the virtual storage array caches 165 are used to store prefetched virtual storage array network data and pending virtual storage array write data for their branch's respective virtual storage arrays.

In an embodiment, each of the branches 155 includes its own separate virtual storage array, which appears to be located within its branch LAN 155. However, the majority of the data storage of a branch's virtual storage array is located within the data center LAN 170 on one or more physical data storage devices 175. The data center LAN 170 is connected with the branch LANs 155 via WAN 185 In an embodiment, each branch's virtual storage array data is stored within a physical storage area network at the data center LAN 170. The physical storage area network may store virtual storage array data 180 for two or more branches. For example, physical data storage array 175 stores virtual storage array data 180a and 180b, which correspond with the data of the virtual storage arrays for branch 155a and 155b, respectively.

In a further embodiment, data optimizations such as data compression and data deduplication can be applied to each branch's virtual storage array data 180 separately or may be consolidated over multiple branches' virtual storage array data 180. For example, redundant data within a single branch's virtual storage array data within the data center's physical storage array network can be compressed or deduplicated to reduce storage requirements. In another further example, if two or more branches' virtual storage arrays include the same or similar data, compression or data deduplication can be applied over all of these virtual storage arrays, such that only a single copy of the redundant data needs to be stored in the physical storage area network. In this example, each of the separate branch virtual storage arrays will reference this single copy of the redundant data. For example, branch's 155a virtual storage array data 180a can be compressed or deduplicated together with branch's 155b virtual storage array data 180b so that there is only a single copy of any redundant data found in both virtual storage arrays.

In another embodiment, the virtual storage array can be used to provide "cloud" storage for network-based applications.

An embodiment of the invention prefetches virtual storage array data to improve data read performance of the virtual storage array. In an embodiment, the branch or data center virtual storage array interface analyzes read and write accesses to a branch's virtual storage array to predict which storage blocks may be accessed in the future. The branch or data center virtual storage array interface then retrieves some or all of these predicted storage blocks and stores them in the branch's virtual storage array cache. If storage client, such as an application server, file server, or client system, later requests access to one or more of the cached storage blocks, the branch virtual storage array interface retrieves the requested storage block from the virtual storage array cache, rather than retrieving the storage block from the physical storage devices located in the data center LAN via the WAN. This storage block prefetching hides the bandwidth and latency of the WAN from the storage client, making the virtual storage array appear as if it is a local storage device.

One complication with storage block prefetching is that sequential data within a file system or file is not necessarily stored as contiguous storage blocks within a storage area network. Similar complications occur when accessing databases or application data, such as e-mail data. This complication is illustrated by FIG. 2A. FIG. 2A illustrates an example 200 of a storage client 205 opening an example file "Foo.txt" and reading the first five file system blocks or clusters of this file. These file protocol reads may be performed using any file system protocol, such as CIFS, NFS, or NTFS. This sequence of file protocol reads is received by a file server 210. The file server 210 translates these file protocol reads into one or more storage area network reads. Each storage area network read retrieves one or more storage blocks from the virtual or physical storage area network 215. The storage area network reads may use any storage area network protocol, such as iSCSI or other protocols discussed above. The sizes and boundaries of file system blocks and storage area network blocks are independent of each other; thus each file system block may correspond with a fraction of a storage area network block, a single storage area network block, or multiple storage area network blocks.

In this example, file system block 0 corresponds with storage area network blocks 101 and 200. File system block 1 corresponds with storage area network block 14. File system block 2 corresponds with storage area network block 25. File system block 3 corresponds with storage area network block 26. File system block 4 corresponds with storage area network block 12. As shown in this example, the first five file system blocks of a file in a file system correspond to six non-sequential storage area network blocks.

Typically, if a storage client requests the first five system blocks of a file, one optimization would be to prefetch and cache additional file blocks in this sequence, such as the next five file system blocks. However, because the storage area network blocks corresponding with this sequence of file blocks are not sequential, storage area network interfaces, which typically only receive requests for storage area network blocks, cannot accurately identify the storage area network blocks corresponding with a predicted sequence of file blocks.

Figure 2B:
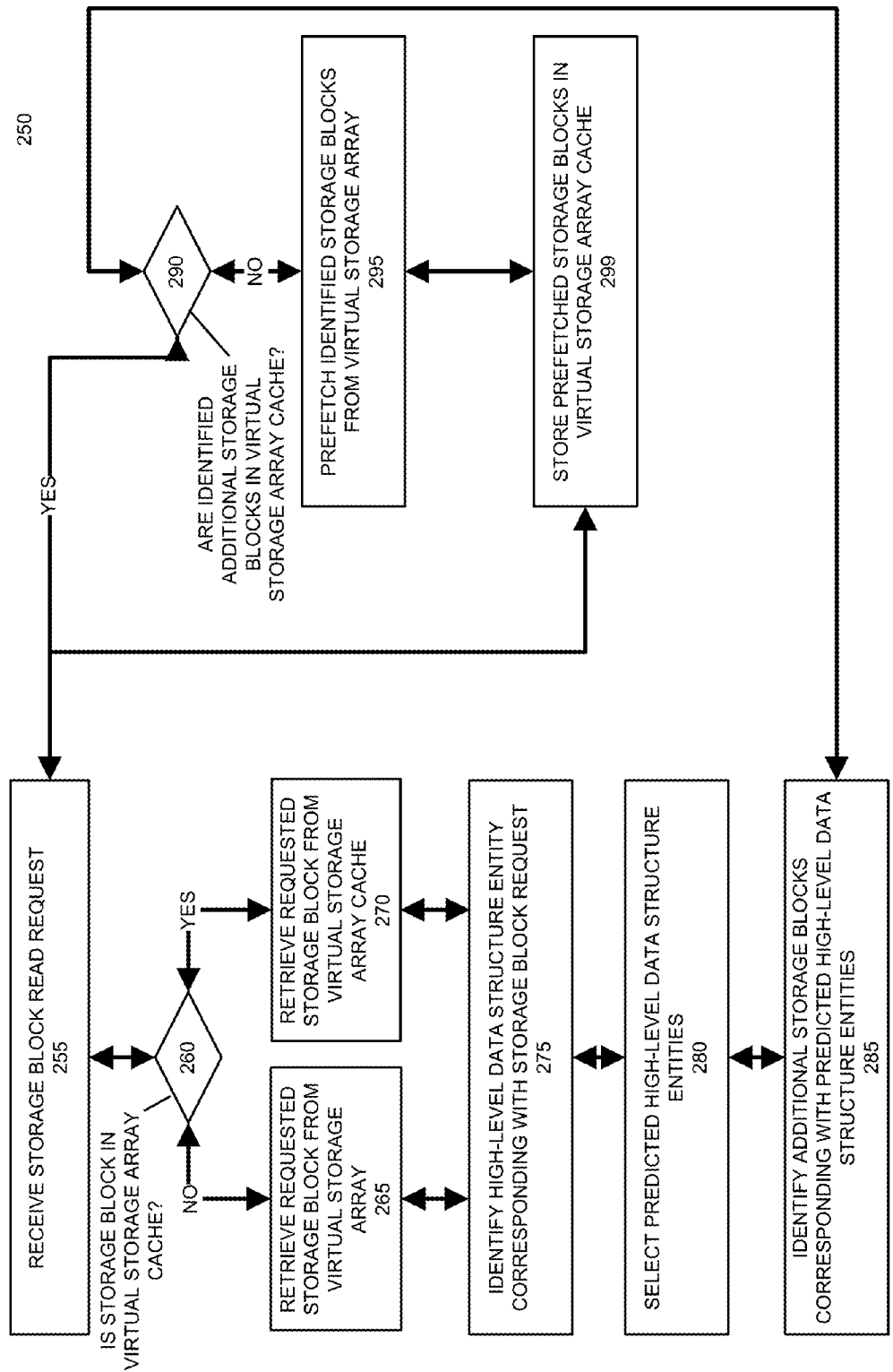

FIG. 2B illustrates a method 250 of performing reactive prefetching of storage blocks according to an embodiment of the invention. Step 255 receives a storage block read request from a storage client, such as a client system or application server, at the branch location. In an embodiment, the storage block read request may be received by a branch location virtual data storage array interface. The storage block read request may be received using a storage area network protocol, such as iSCSI.

In response to the receipt of the storage block read request in step 255, decision block 260 determines if the requested storage block has been previously retrieved and stored in the storage block read cache at the branch location. If so, step 270 retrieves the requested storage block from the storage block read cache and returns it to the requesting storage client. In an embodiment, if the system includes a data center virtual storage array interface, then step 270 also forwards the storage block read request back to the data center virtual storage array interface for use in identifying additional storage blocks likely to be requested by the storage client in the future.

If the storage block read cache at the branch location does not include the requested storage block, step 265 retrieves the requested storage block via a WAN connection from the virtual storage array data located in a physical data storage at the data center. In an embodiment, a branch location virtual storage array interface forwards the storage block read request to the data center virtual storage array interface via the WAN connection. The data center virtual storage array interface then retrieves the requested storage block from the physical storage array and returns it to the branch location virtual storage array interface, which in turn provides this requested storage block to the storage client. In a further embodiment of step 265, a copy of the retrieved storage block may be stored in the storage block read cache for future accesses.

During and/or following the retrieval of the requested storage block from the virtual storage array or virtual storage array cache, steps 275 to 299 prefetch additional storage blocks likely to be requested by the storage client in the near future. Step 275 identifies a high-level data structure entity associated with the requested storage block. Examples of high-level data structure entities include file system entities such as files, directories, and file system blocks or clusters; and database structures such as database tables, rows, and nodes. Typical block storage protocols, such as iSCSI and FCP, specify block read requests using a storage block address or identifier. However, these storage block read requests do not include any identification of the associated high-level data structure entity, such as a specific file, directory, or database entity, that is associated with this storage block.

Therefore, an embodiment of step 275 identifies the high-level data structure entity corresponding with the requested storage block. In an embodiment of step 275, a branch or data center virtual storage array interface searches a file system data structure, such as an allocation table or tree, or a database data structure, such as a B-tree, to identify one or more high-level data structure entities corresponding with the requested storage block. In a further embodiment of step 275, a branch or data center virtual storage array interface preprocesses data structures to create other databases, tables, or other data structures adapted to facilitate searching for high-level data structure entities corresponding with storage blocks. These data structures mapping storage blocks to corresponding high-level data structure entities may be updated frequently or infrequently, depending upon the desired prefetching performance.

In a further embodiment, step 275 also determines a location or range of locations within the high-level data structure entity corresponding with the requested storage block. For example, a storage block may correspond with a specific range of addresses or offsets within a larger file.

Using the identification of the high-level data structure entity and optionally the location provided by step 275, step 280 identifies additional high-level data structure entities or portions thereof that are likely to be requested by the storage client. There are a number of different techniques for identifying addition high-level data structure entities or portions thereof for prefetching that may be used by embodiments of step 280. Some of these are described in detail in co-pending U.S. patent application Ser. No. 12/730,198, entitled "Virtual Data Storage System Optimizations", filed Mar. 23, 2010, which is incorporated by reference herein for all purposes.

One example technique used by an embodiment of step 280 is to prefetch portions of the high-level data structure entity based on their adjacency or close proximity to the identified portion of the entity. For example, if step 275 determines that the requested storage block corresponds with a portion of a file from file offset 0 up to offset 4095, then step 280 may identify a second portion of this same file beginning with offset 4096 for prefetching. It should be noted that although these two portions are adjacent in the high-level data structure entity, their corresponding storage blocks may be non-contiguous.

Further embodiments of the invention may use other heuristics or other techniques to select predicted file system blocks, such as knowledge of application behavior associated with a file type. For example, application or protocol specific information may be used to identify storage blocks for prefetching and caching. For example, if the virtual storage array is used to store e-mail data, a branch or data center virtual storage array interface may identify an e-mail account or e-mail message ID associated with a requested storage block and then identify and prefetch storage blocks associated with the same user, with the same e-mail message ID, and/or with e-mail messages having nearby e-mail message IDs. This application or protocol specific information may be used alone or in conjunction with the above-described file system or database data.

Another example technique is to identify the type of file or directory, database table, or other type of high-level data structure entity associated with a selected or recently accessed storage block, and apply one or more heuristics to identify additional portions of this high-level data structure entity or a related high-level data structure entity for prefetching. Storage blocks corresponding with the identified additional portions of the high-level data structure entities are then prefetched and cached at the branch location.

Yet another example technique monitors the times at which high-level data structure entities are accessed. High-level data structure entities that are accessed at approximately the same time are associated together by the virtual storage array interface. If any one of these associated high-level data structure entities is later accessed again, the virtual storage array interface identifies one or more associated high-level data structure entities that were previously accessed at approximately the same time as the requested high-level data structure entity for prefetching. Storage blocks corresponding with the identified additional high-level data structure entities are then prefetched and cached at the branch location.

In still another example technique, a virtual storage array interface analyzes the high-level data structure entity associated with the requested storage block to identify related portions of the same or other high-level data structure entity for prefetching. For example, application files may include references to additional files, such as overlay files or dynamically loaded libraries. Similarly, a database table may include references to other database tables. Operating system and/or application log files may list a sequence of files or other resources accessed during a system or application startup. Storage blocks corresponding with the identified related high-level data structure entities are then prefetched and cached at the branch location.

Further embodiments of the virtual storage array interface may identify corresponding high-level data structure entities directly from requests for storage blocks. Additionally, embodiments of the virtual storage array interface may successively apply any number of successive transformations to storage block requests to identify associated high-level data structure entities. These successive transformations may include transformations to intermediate level data structure entities. Intermediate and high-level data structure entities may include virtual machine data structures, such as virtual machine file system files, virtual machine file system storage blocks, virtual machine storage structures, and virtual machine disk images.

As described above, the branch and data center virtual storage array interfaces allows storage users, such as clients, servers, and virtualized servers in virtual machines, at the branch location to access data storage at the data center location via a WAN as if the data storage was at the branch location. The virtual storage array interfaces use prefetching and other optimization techniques to hide the bandwidth, latency, and reliability limitations of the WAN from storage users.

Step 280 identifies all or portions of one or more high-level data structure entities for prefetching based on the high-level data structure entity associated with the requested storage block. However, as discussed above, storage clients specify data access requests in terms of storage blocks, not high-level data structure entities such as files, directories, or database entities. Thus, step 285 identifies one or more storage blocks corresponding with the high-level data structure entities identified for prefetching in step 280. In an embodiment, step 285 identifies additional storage blocks corresponding with the high-level data structure entities by accessing the data structures associated with a file system data structure, such as an allocation table or tree, or a database data structure, such as a B-tree, in a manner similar to a client system or application server requesting a high-level data structure entity. In another embodiment, step 280 accesses a separate data structure maintained by a virtual storage array interface to identify one or more storage blocks corresponding with the high-level data structure entities identified for prefetching.

Decision block 290 determines if any of the storage blocks identified in step 285 have already been stored in the storage block read cache located at the branch location. If not, step 295 retrieves these uncached additional storage blocks from the virtual storage array data located in a physical data storage on the data center LAN and sends them via a WAN connection to the appropriate branch LAN. Step 299 stores these additional storage blocks in the branch's virtual storage array cache for potential future access by storage clients within the branch LAN. In a further embodiment, decision block 290 and the determination of whether an additional storage block has been previously retrieved and cached may be omitted. Instead, this embodiment can send all of the identified additional storage blocks to the branch virtual storage array interface to be cached. The branch virtual storage array interface may then discard any redundant storage blocks. This embodiment can be used when WAN latency, rather than WAN bandwidth limitations, are an overriding concern.

Although the method 250 of FIG. 2B is described with respect to accessing files via the virtual storage array, embodiments of method 250 can also be applied to non-file based storage accesses. For example, an embodiment of method 250 can be applied to access databases via the virtual storage array. In this embodiment, portions of database tables or B-tree child nodes, rather than file system blocks, are used to identify corresponding storage blocks for prefetching and caching by a branch virtual storage array interface In another example, indirect blocks of a file system may be used to identify additional storage blocks to be prefetched and cached.

Following step 299, method 250 proceeds to step 255 to await receipt of further storage block requests. The storage blocks added to the storage block read cache in previous iterations of method 250 may be available for fulfilling storage block read requests.

Method 250 may be performed by a branch virtual data storage array interface, by a data center virtual data storage array interface, or by both virtual data storage array interfaces working in concert. For example, steps 255 to 270 of method 250 may be performed by a branch location virtual storage array interface and steps 275 to 299 of method 250 may be performed by a data center virtual storage array interface. In another example, all of the steps of method 250 may be performed by a branch location virtual storage array interface.

Figure 3:
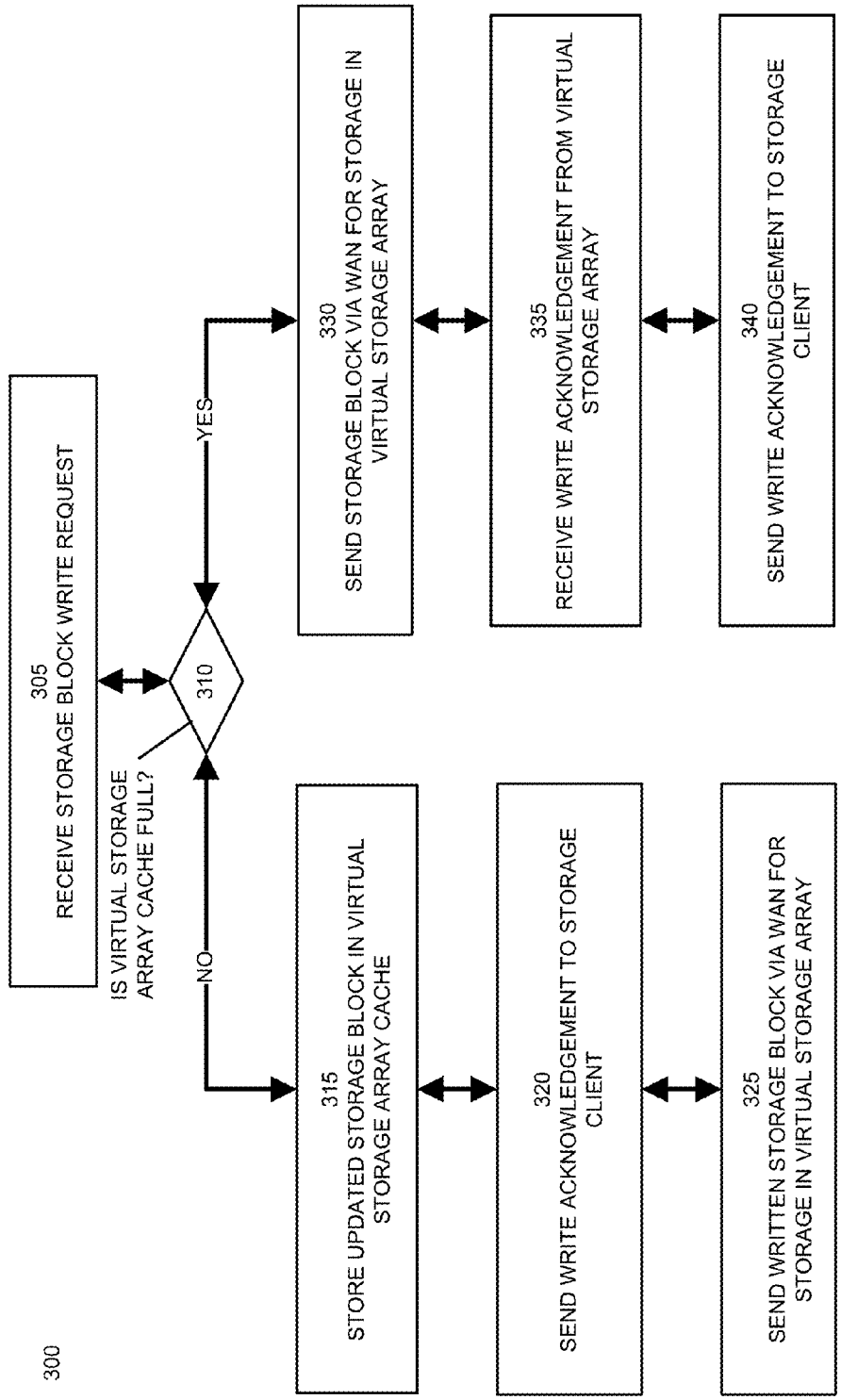
FIG. 3 illustrates a method of optimizing data writes in a virtual storage array system according to an embodiment of the invention.

Similarly, the virtual storage array cache can be used to hide latency and bandwidth limitations of the WAN during virtual storage array writes. FIG. 3 illustrates a method 300 of optimizing data writes in a virtual storage array system according to an embodiment of the invention.

An embodiment of method 300 starts with step 305 receiving a storage block write request from a storage client within the branch LAN. The storage block write request may be received by a branch virtual storage interface.

In response to the receipt of the storage block write request, decision block 310 determines if the virtual storage array cache is capable of accepting additional write requests or is full. In an embodiment, the virtual storage array cache may use some or all of its storage as a queue for pending virtual storage array operations.

If decision block 310 determines that the virtual storage array cache can accept an additional storage block write request, then, in an embodiment of method 300, step 315 stores the storage block write request, including the storage block data to be written, in the virtual storage array cache. In this embodiment of method 300, step 320 then sends a write acknowledgement to the storage client. Following the storage client's receipt of this write request, the storage client believes its storage block write request is complete and can continue to operation normally. However, in step 325, the virtual storage array interface will transfer the queued written storage block via the WAN to the physical storage array at the data center LAN. In an embodiment, step 325 may perform this transfer in the background and asynchronously with the operation of storage clients.

While a storage block write request is queued and waiting to be transferred to the data center, a storage client may wish to access this storage block for a read or write. In this situation, the virtual storage array interface intercepts the storage block access request. In the case of a storage block read, the virtual storage array interface provides the storage client with the queued storage block. In the case of a storage block write, the virtual storage array interface will update the queued storage block data and send a write acknowledgement to the storage client for this additional storage block access.

Conversely, if decision block 310 determines that the virtual storage array cache cannot accept an additional storage block write request, then step 330 immediately transfers the storage block via the WAN to the physical storage array at the data center LAN. Following completion of this transfer, step 335 receives a write acknowledgement from the data center virtual storage array interface or the physical data storage array itself. Step 340 then sends a write acknowledgement to the storage client, allowing the storage client to resume normal operation.

In a further embodiment, a virtual storage array interface may throttle storage block read and/or write requests from storage clients to prevent the virtual storage array cache from filling up under typical usage scenarios.

Figure 4A:
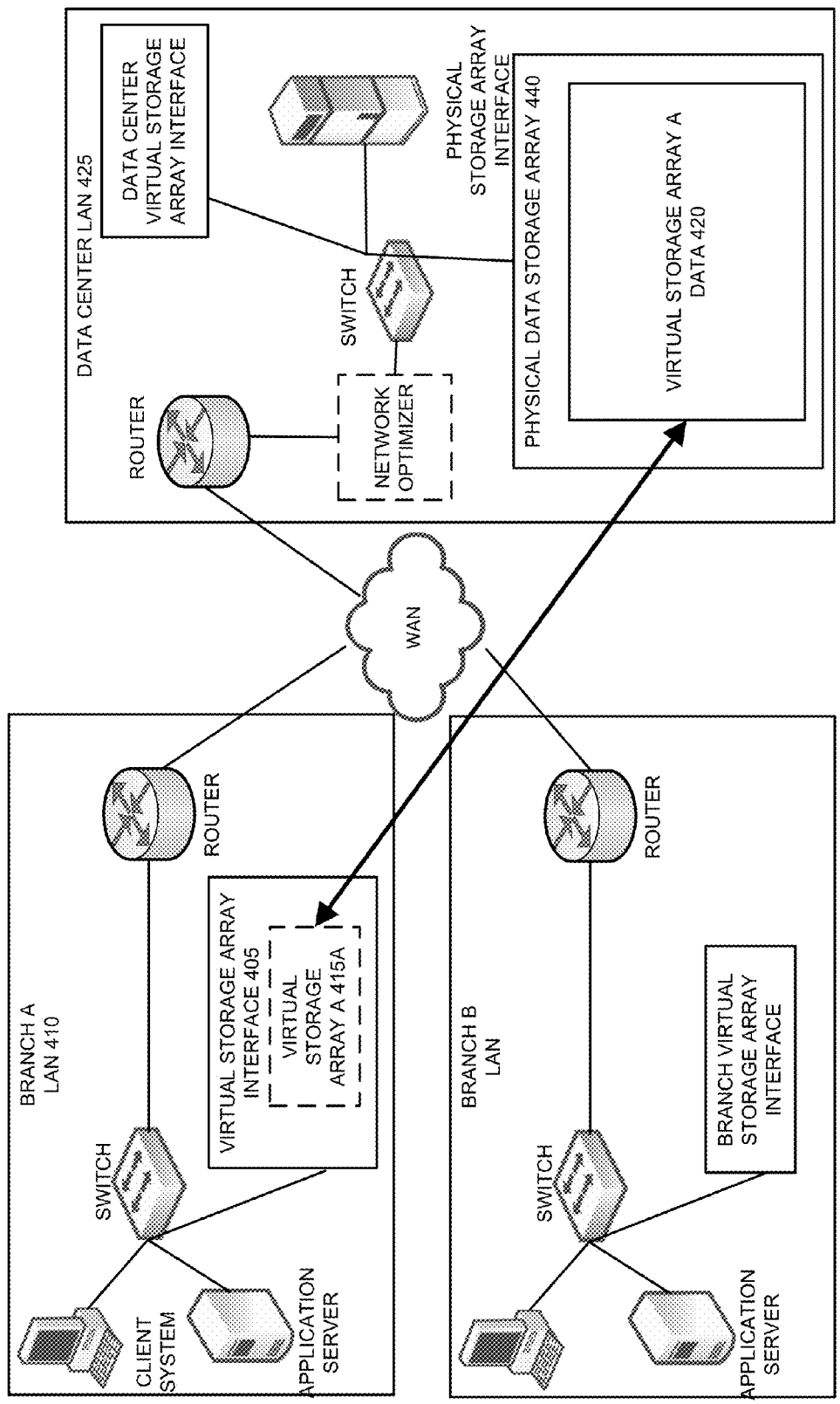
FIGS. 4A-4B illustrate data migration of virtual storage array system according to an embodiment of the invention.
Figure 4B:
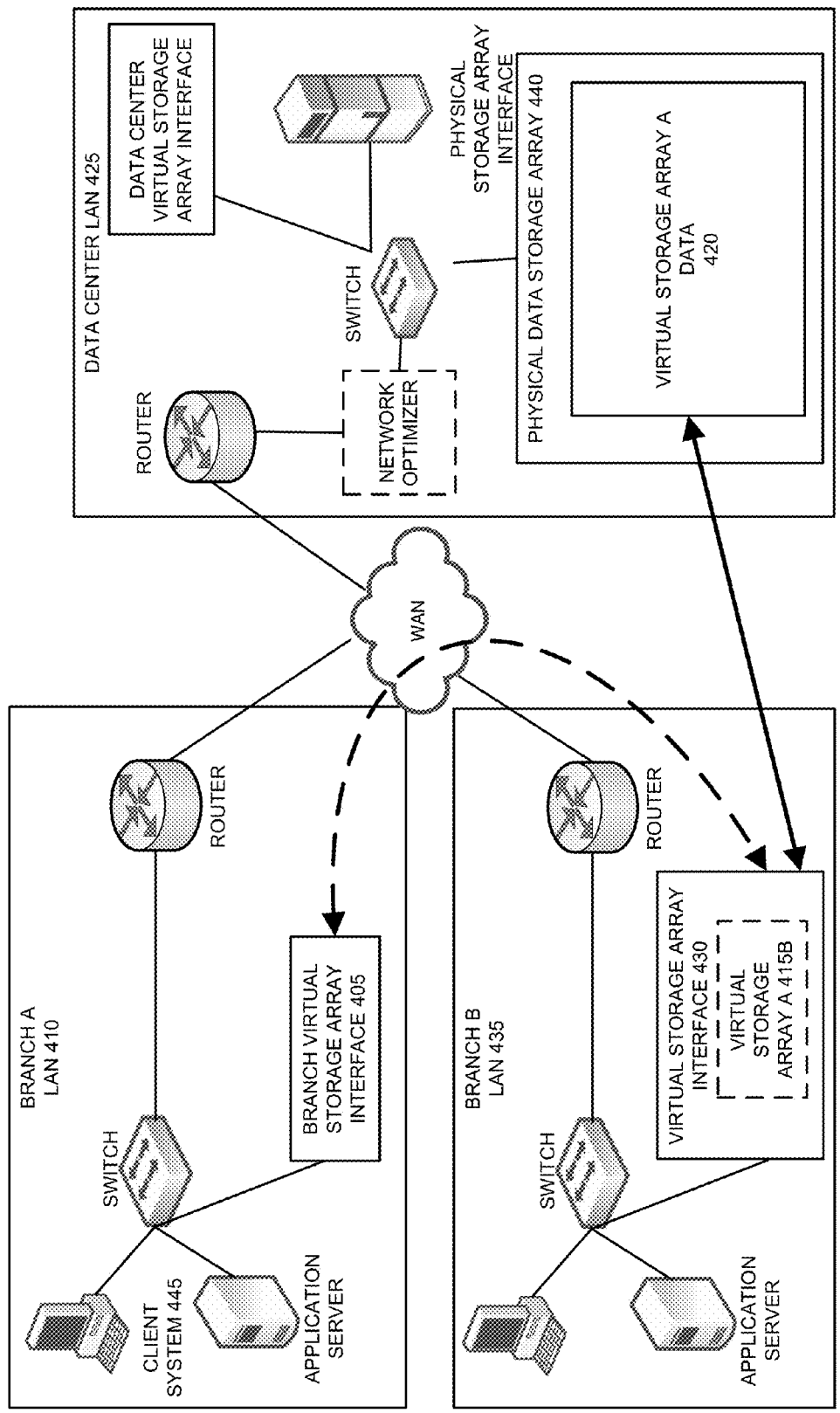

FIGS. 4A-4B illustrate data migration of virtual storage array system according to an embodiment of the invention. Because the data storage of a branch's virtual storage array is located at a data center, rather than at the branch location, migrating data from one branch to another branch is straightforward. For example, FIG. 4A illustrates a first branch virtual storage interface 405 at a first branch 410 that provides access to a virtual storage array 415*a*, having its virtual storage array data 420 stored in physical storage 440 at a data center 425. To migrate this example virtual storage array 415*a* to a second branch, the first branch virtual storage array interface is configured to deactivate the first branch's access to the virtual storage array. A second branch virtual storage array interface at the second branch is then configured to access the virtual storage array data at the data center, thus providing the second branch with access to the virtual storage array.

Continuing from the example of FIG. 4A, FIG. 4B illustrates an example of a second branch virtual storage interface 430 at a second branch 435 that provides access to a virtual storage array 415*b*, having its virtual storage array data 420 stored at a data center 425. In this example, the first branch virtual storage array interface 405 at the first branch 410 has been configured to deactivate the first branch's access to the virtual storage array. As a result, the second branch 435 has exclusive access to the virtual storage array data 420 via virtual storage array 415*b*.

In a further embodiment, upon deactivating the virtual storage array 415*a* at a first branch 410, the first branch virtual storage interface is adapted to transfer any updated storage data in its virtual storage array cache, such as new or updated storage blocks associated with pending write operations, back to the virtual storage array data 420 in the physical data storage array 440. This ensures that the virtual storage array data 420 maintained at the data center 425 is up to date.

Moreover, because the virtual storage array data 420 does not change location when a virtual storage array 415 is migrated to a new location, virtual storage arrays can be migrated frequently. For example, if an organization has a first branch in New York and a second branch in India, a virtual storage array may be migrated between these offices every work day. Because of the time differences between these two locations, the virtual storage array enables a 24-hour work cycle. During business hours in the New York branch, the New York branch will be given access to the virtual storage array. At the same time, it is late at night in India; thus this branch does not require access to the virtual storage array. When business hours are over in New York, the New York branch virtual storage array interface deactivates its virtual storage array access and completes any remaining updates to the virtual storage array data at the data center. Then, the India branch virtual storage array interface can activate virtual storage array access for the India branch. This allows the India branch to access the virtual storage array while the New York branch is closed for the night.

At the end of business hours in India, this process is reversed and the New York branch reconnects with the virtual storage array. In this example, because the New York branch was previously connected to the virtual storage array, the virtual storage array cache at the New York branch may already include copies of storage blocks from the virtual storage array. These copies of storage blocks were left in the New York branch's virtual storage array cache from the previous time when the virtual storage array was connected with this branch location. However, some or all of these copies of storage blocks in the New York branch's virtual storage array may not be valid anymore because the India branch has updated the corresponding storage blocks in the virtual storage array. In an embodiment, upon either disconnecting or reconnecting with a virtual storage array, an embodiment of the branch virtual storage array interface invalidates any copies of storage blocks in its virtual storage array cache. In this example, the New York branch virtual storage array interface would invalidate any copies of storage blocks from the virtual storage array in its virtual storage array cache upon either disconnecting or reconnecting with the virtual storage array.

In another embodiment, a branch virtual storage array interface may retain and use valid copies of storage blocks in its virtual storage array cache upon reconnecting with the virtual storage array. In this embodiment, either the data center virtual storage array interface or the previously connected branch virtual storage array interface provides the reconnecting branch virtual storage array interface with a list of invalid storage blocks. The reconnecting branch virtual storage array interface can compare this list with the copies of storage blocks in its virtual storage array cache and invalidate any matching storage blocks. Any copies of storage blocks in the virtual storage array cache that are not marked as invalid may be used by the branch virtual storage array interface when it reconnects with the virtual storage array. In this embodiment, the list of invalid storage blocks may be sent to one or more deactivated branch virtual storage array interfaces as the currently active branch virtual storage array interface performs storage block writes or in batches, for example during the deactivation of one branch virtual storage array interface and the reactivation and reconnection of another branch virtual storage array interface.

In some cases, there may be some storage clients in a branch operating past business hours. In an embodiment, a virtual storage array interface at the branch can connect with the virtual storage array interface that is currently connected with the virtual storage array data via the WAN to provide after-hours storage clients access to the virtual storage array. For example, in FIG. 4B, the virtual storage array data 420 is accessed by virtual storage array 415*b* currently provided by virtual storage array interface 430 located at the second branch 435. If a client system 445 at the first branch 410 needs to access data in the virtual storage array 415*b*, the client system 445 contacts the first virtual storage array interface 405. The first virtual storage array interface 405 then contacts the second virtual storage array interface 430 to access the virtual storage array 415*b*. If the client system 445 needs to write or modify storage blocks in the virtual storage array, an embodiment of the virtual storage array system directs the storage block write data directly to the active branch virtual storage array interface, for example the second virtual storage array interface 430.

In a further embodiment, one or more virtual machines executing virtual storage array applications, application servers, and/or other applications may migrate with a virtual storage array between two or more branches. In this embodiment, an application server, such as a database application or an e-mail server and its associated data storage, implemented using a virtual storage array, may move together between branches. Because the application server is implemented within a virtual machine, this migration between branches may be seamless from the perspective of the application server. Moreover, because the virtual storage array centralizes data storage at the data center, rather than branch locations, regardless of which branch virtual storage array interface is being use, the migration of virtual machines and applications does not require the transfer of any of the virtual machine state and data to the destination branch locations prior to the reactivation of the virtual machine. Once the virtual machine is reactivated at the destination branch location, this branch location's virtual storage array interface only needs the storage blocks that are requested directly by the virtual machine or its applications and not in its storage block cache and the storage blocks that are prefetched in anticipation of a virtual machine or application request.

FIG. 5 illustrates a method 500 of creating data snapshots of a virtual storage array according to an embodiment of the invention. An embodiment of the method 500 begins in step 505 with the initiation of a virtual storage array checkpoint. A virtual storage array checkpoint may be initiated automatically by a branch virtual storage interface according to a schedule or based on criteria, such as the amount of data changed since the last checkpoint. In a further embodiment, a virtual storage array checkpoint may be initiated in response to a request for a virtual storage array snapshot from a system administrator or administration application.

To create a virtual storage array checkpoint, in an embodiment of the method 500, step 510 sets the branch virtual storage array interface to a quiescent state. This entails completing any pending operations with storage clients (though not necessarily background operations between the branch and data center virtual storage array interfaces). While in the quiescent state, the branch virtual storage interface will not accept any new storage operations from storage clients.

Once the branch virtual storage array interface is set to a quiescent state by step 510, in step 515, an embodiment of the branch virtual storage array interface identifies updated storage blocks in its associated virtual storage array cache. These updated storage blocks include data that has been created or updated by storage clients but have yet to be transferred via the WAN back to the data center LAN for storage in the physical data storage array.

Once all of the updated storage blocks have been identified, in step 515 an embodiment of the branch virtual storage array creates a checkpoint data structure. The checkpoint data structure specifies a time of checkpoint creation and the set of updated storage blocks at that moment of time. Following the creation of the checkpoint data structure, in an embodiment of the method 500, step 520 reactivates the branch's virtual storage array. Following step 520, the branch virtual storage array interface can resume servicing storage operations from storage clients. Additionally, the branch virtual storage array may resume transferring new or updated storage blocks via the WAN to the data center LAN for storage in the physical data storage array. In a further embodiment, the virtual storage array cache may maintain a copy of an updated storage block even after a copy is transferred back to the data center LAN for storage. This allows subsequent snapshots to be created based on this data.

In an embodiment, following the reactivation of the virtual storage array in step 520, the virtual storage array interface preserves the updated storage blocks specified by the checkpoint data structure from further changes. If a storage client attempts to update a storage block that is associated with a checkpoint, an embodiment of the virtual storage array interface creates a duplicate of this storage block in the virtual storage array cache to store the updated data. This preserves the data of this storage block at the time of the checkpoint for potential future reference.

Optionally, an embodiment of the method 500 may initiate one or more additional virtual storage array checkpoints at later times or in response to criteria or conditions. Embodiments of the virtual storage array interface may maintain any arbitrary number of checkpoint data structures and automatically delete outdated checkpoint data structures. For example, a branch virtual storage interface may maintain only the most recently created checkpoint data structure, or checkpoint data structures from the beginning of the most recent business day and the most recent hour.

At some point, a system administrator or administration application may request a snapshot of the virtual storage array data. A snapshot of the virtual storage array data represents the complete set of virtual storage array data at a specific moment of time. Step 525 receives a snapshot request from a system administrator or administration application. In response to a snapshot request, in step 530, an embodiment of a branch virtual storage array interface transfers a copy of the appropriate checkpoint data structure to the data center virtual storage interface. Additionally, the branch virtual storage array interface transfers a copy of any updated storage blocks specified by this checkpoint data structure.

In an embodiment, the data center virtual storage array interface creates a snapshot of the data of the virtual storage array. The snapshot includes a copy of the all of the virtual storage array data in the physical data storage array unchanged from the time of creation of the checkpoint data structure. The snapshot also includes a copy of the updated storage blocks specified by the checkpoint data structure. An embodiment of the data center virtual storage array interface may store the snapshot in the physical storage array or using a data backup. In an embodiment, the data center virtual storage array interface automatically sends storage operations to the physical storage array interface to create a snapshot from a checkpoint data structure. These storage operations can be carried out in the background by the data center virtual storage array interface in addition to translating virtual storage array operations from one or more branch virtual storage array interfaces into corresponding physical storage array operations.

As described above, storage clients can interact with virtual storage arrays in the same manner that they would interact with physical storage arrays. This includes issuing storage commands to the branch virtual storage interface using storage array network protocols such as iSCSI or Fibre Channel protocol. Most storage array network protocols organize data according to storage blocks, each of which has a unique storage address or location. A storage block's unique storage address may include logical unit number (using the SCSI protocol) or other representation of a logical volume.

In an embodiment, the virtual storage arrays provided by branch virtual storage interfaces allow storage clients to access storage blocks by their unique storage address within the virtual storage array. However, because one or more virtual storage arrays actually store their data within a physical storage array, for example implemented as a physical storage area network, an embodiment of the invention allows arbitrary mappings between the unique storage addresses of storage blocks in the virtual storage array and the corresponding unique storage addresses in one or more physical storage arrays. In an embodiment, the mapping between virtual and physical storage address may be performed by a branch virtual storage array interface and/or by a data center virtual storage array interface. Furthermore, there may be multiple levels of mapping between a branch virtual storage array and the physical storage array.

In an embodiment, storage blocks in the virtual storage array may be of a different size and/or structure than the corresponding storage blocks in the physical storage array. For example, if data compression is applied to the storage data, then the physical storage array data blocks may be smaller than the storage blocks of the virtual storage array, to take advantage of data storage savings. In an embodiment, the branch and/or data center virtual storage array interfaces map one or more virtual storage array storage blocks to one or more physical storage array storage blocks. Thus, a virtual storage array storage block can correspond with a fraction of a physical storage array storage block, a single physical storage array storage block, or multiple physical storage array storage blocks, as required by the configuration of the virtual and physical storage arrays.

Figure 6:
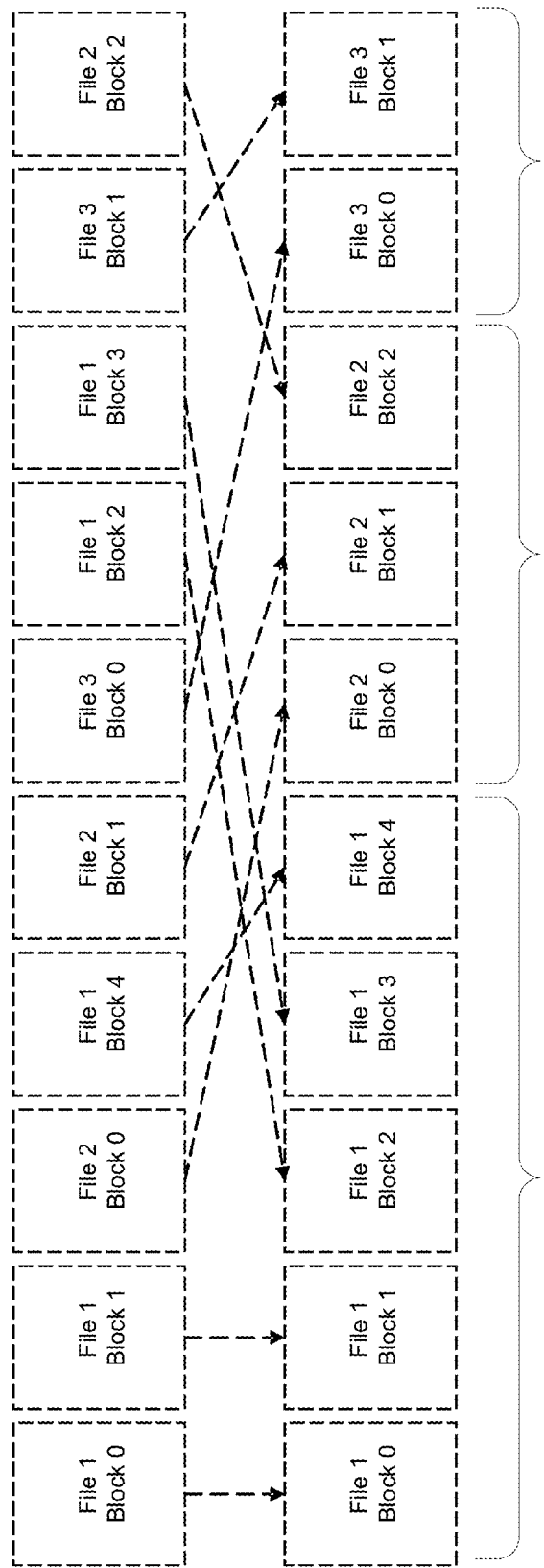
FIG. 6 illustrates an example optimized data compression and deduplication using file-system or other storage format awareness according to an embodiment of the invention.

In a further embodiment, the branch and data center virtual storage array interfaces may reorder or regroup storage operations from storage clients to improve efficiency of data optimizations such as data compression. For example, if two storage clients are simultaneously accessing the same virtual storage array, then these storage operations will be intermixed when received by the branch virtual storage array interface. An embodiment of the branch and/or data center virtual storage array interface can reorder or regroup these storage operations according to storage client, type of storage operation, data or application type, or any other attribute or criteria to improve virtual storage array performance and efficiency. For example, a virtual storage array interface can group storage operations by storage client and apply data compression to each storage client's operations separately, which is likely to provide greater data compression than compressing all storage operations together. FIG. 6 illustrates an example 600 of optimized data compression and deduplication using filesystem or other storage format awareness, such as database nodes, according to an embodiment of the invention. In the example 600, incoming requests for file system blocks or clusters are regrouped and reordered based on their associated file system file and their position within their respective files.

In an embodiment, unique storage labels can be assigned to storage blocks or groups of storage blocks in the virtual storage array cache. These unique storage labels can be determined arbitrarily or based on the data included in storage blocks, for example using hashes or hashes of hashes. Furthermore, hierarchical labels may be assigned to storage blocks. A hierarchical label is associated with a sequence of one or more additional labels. Each of these additional labels is associated with either a storage block or one or more additional labels. By assigning labels to storage blocks, WAN optimization techniques can be further applied to virtual storage array data traffic between the branch LAN and the data center LAN.

Figure 7:
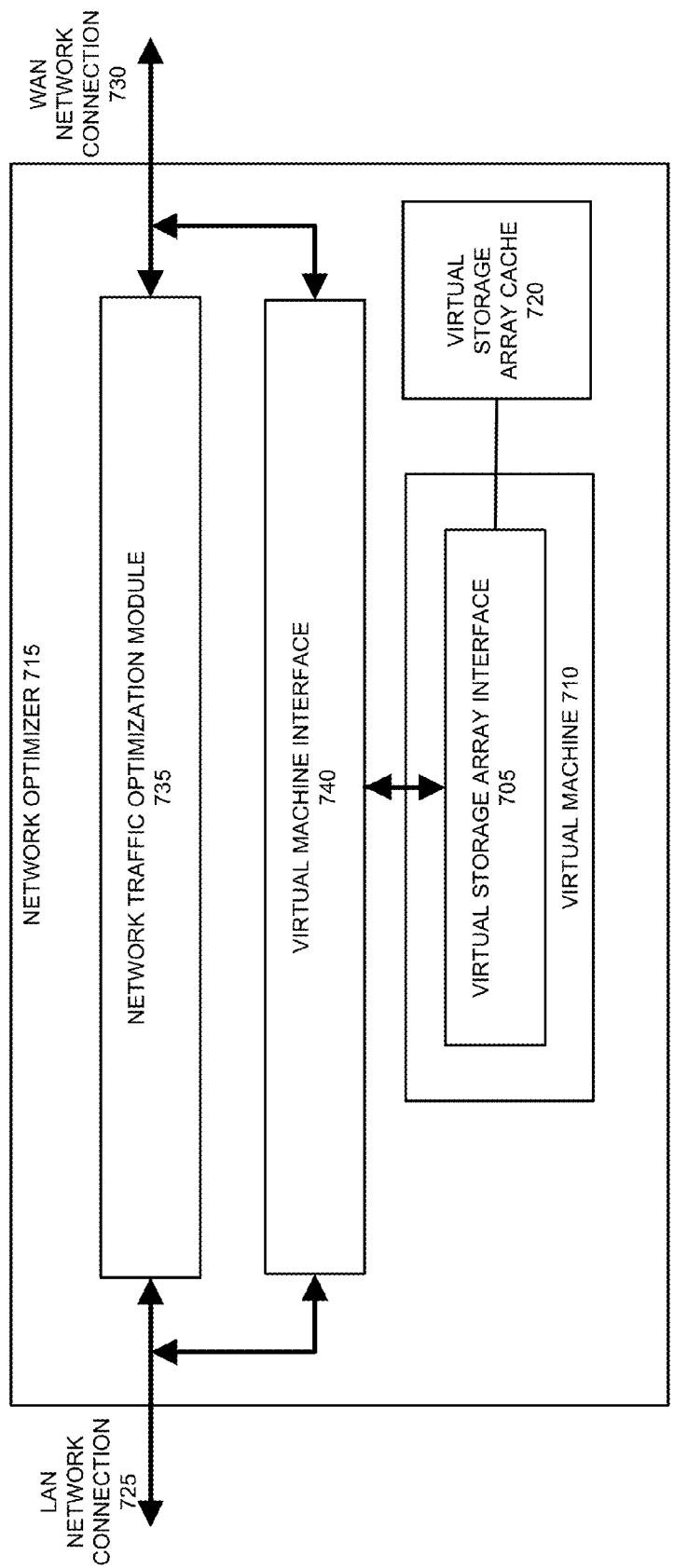
FIG. 7 illustrates an example virtual machine implementation of a virtual storage array interface according to an embodiment of the invention.

Embodiments of the invention can implement virtual storage array interfaces at the branch and/or data center as standalone devices or as part of other devices, computer systems, or applications. FIG. 7 illustrates an example virtual machine implementation 700 of a virtual storage array interface according to an embodiment of the invention. In this example virtual machine implementation 700, the virtual storage array interface 705 is implemented as a software application executed by a virtual machine 710. The virtual machine 710 is located in this example within a network optimizer device 715; however, other embodiments of this virtual machine implementation 700 can be located within other types of network devices, including switches, routers, and storage devices and interfaces.

In an embodiment, the virtual machine 710 implementing the virtual storage interface is optionally connected with an internal or external data storage device to act as a virtual storage array cache 720.

In an embodiment, the network optimizer 715 include LAN and WAN network connections 725 and 730 for intercepting network traffic. A virtual machine hardware and software interface 740 is connected with these network connections to allow the virtual machine to send and receive network communications. In this example, the network optimizer also includes a network optimization module 735 for performing WAN optimization techniques on network traffic passing between the LAN and the WAN network connections 725 and 730.

In a further embodiment, the network optimizer 715 or other host device may include multiple virtual machines for executing additional applications, application servers, and/or performing additional data processing functions. For example, a network optimizer device can include a first virtual machine for implementing a virtual storage array interface to a virtual storage array; a second virtual machine for implementing an application server, such as a database application; and a third virtual machine executing a data processing application, such as an anti-virus scanning application. In this example, the virtual machines can communicate with each other as well as with other entities connected via the local and wide area networks.

Figure 8:
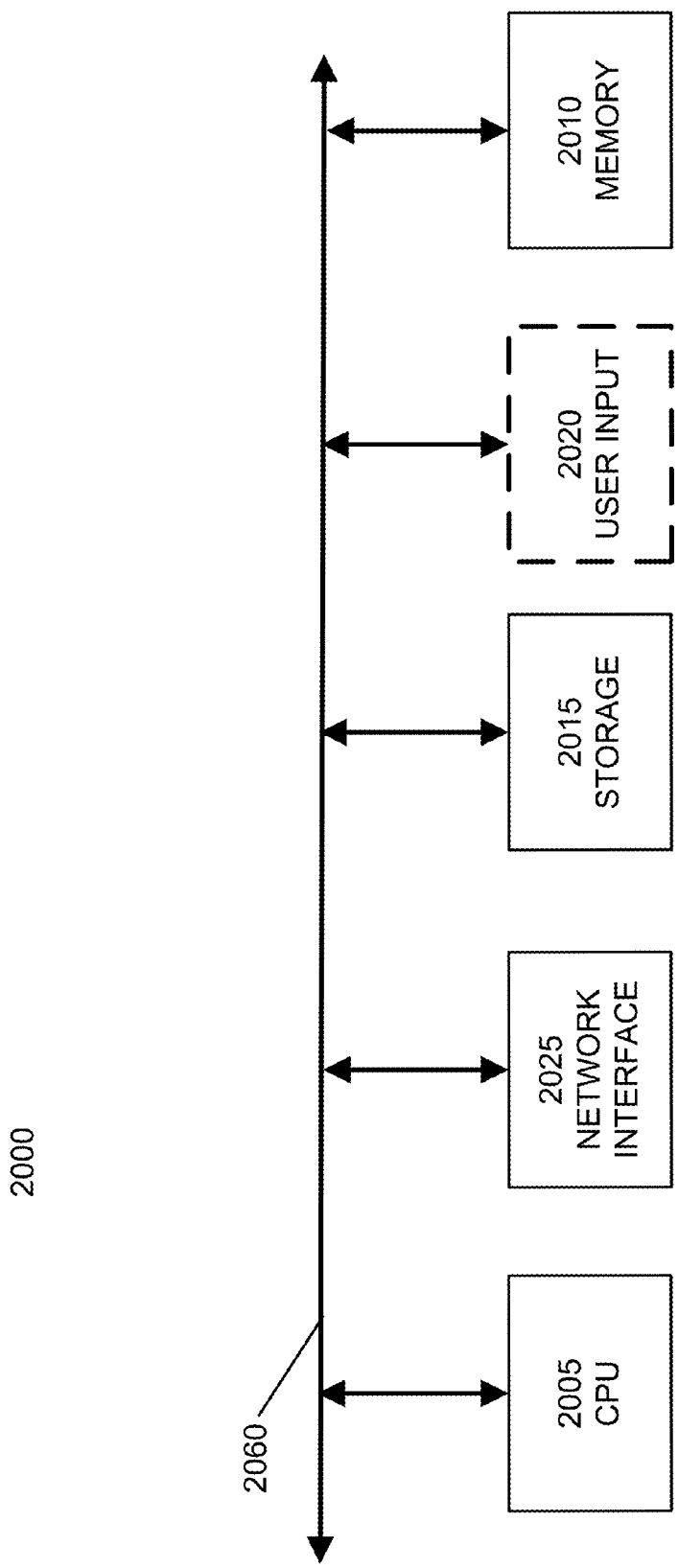
FIG. 8 illustrates an example computer system capable of implementing a virtual storage array interface according to an embodiment of the invention.

FIG. 8 illustrates an example computer system capable of implementing a virtual storage array interface according to an embodiment of the invention. FIG. 8 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. In a further embodiment, CPU 2005 may execute virtual machine software applications to create one or more virtual processors capable of executing additional software applications and optional additional operating systems.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11 g, and 802.11n.

An embodiment of the computer system 2000 may also include a wired networking interface, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Figure 9:
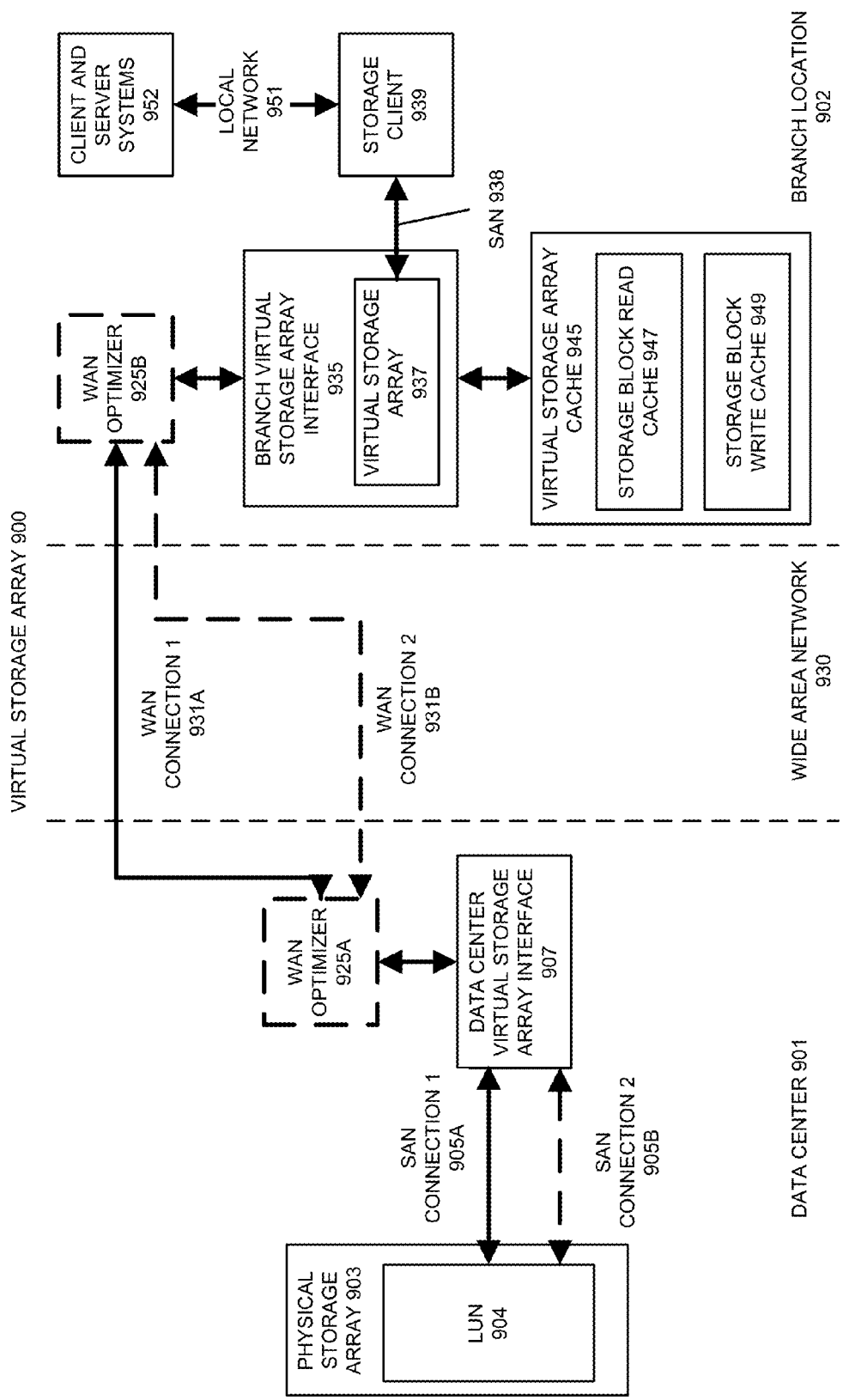
FIG. 9 illustrates example quality of service (QoS) features suitable for use with embodiments of the invention.

FIG. 9 illustrates example quality of service (QoS) features suitable for use with embodiments of the invention. FIG. 9 illustrates an example virtual storage array system 900 according to an embodiment of the invention. Virtual storage array system 900 includes a data center 901 connected with at least one branch network location 902 via a wide-area network (WAN) 930. Each branch location 902 includes at least one storage client 939, such as a file server, application server, database server, or storage area network (SAN) interface. A storage client 939 may be connected with a local-area network (LAN) 951, including routers, switches, and other wired or wireless network devices, for connecting with server and client systems and other devices 952.

The branch location 902 includes a virtual storage array interface device 935. The virtual storage array interface device 935 presents a virtual storage array 937 to branch location users, such as the branch location storage client 939. The branch location virtual storage array interface 935 includes one or more storage array network interfaces to connect with one or more storage clients 939 via a local storage area network (SAN) 938. The branch location virtual storage array interface 935 includes a virtual storage array cache 945, which is used to ameliorate the effects of the WAN 930 on virtual storage array 937 performance. In an embodiment, the virtual storage array cache 945 includes a storage block read cache 947 and a storage block write cache 949.

In an embodiment, the branch location virtual storage array interface 935 operates in conjunction with a data center virtual storage array interface 907. The data center virtual storage array interface 907 is located at the data center 901. The data center virtual storage array interface 907 is connected with one or more physical data storage devices 903 to store and retrieve data for one or more virtual storage arrays, such as virtual storage array 937. To this end, an embodiment of a data center virtual storage array interface 907 accesses a physical storage array network interface, which in turn accesses physical data storage array 903 on a data center storage array network (SAN) 905. The virtual data storage array 937 presents a virtualized logical storage unit, such as an iSCSI or FibreChannel logical unit number (LUN), to storage client 939. This virtual logical storage unit is mapped to a corresponding logical storage unit 904 on physical data storage array 903. Both the branch location and data center location may optionally include WAN optimizers 925*a* and 925*b*, respectively.

Example virtual storage array system 900 may employ one or more quality of service (QoS) features to optimize performance of the virtual storage array 937. In a first embodiment, data center and/or branch virtual storage array interfaces prioritize storage block requests from the storage client 939 ahead of storage requests for prefetched storage blocks for communication over the WAN 930. In a further embodiment, the virtual storage array interfaces may prioritize storage requests from different client and server systems, different storage clients, and/or different applications for communication over the WAN 930. In another embodiment of QoS features, the virtual storage array interfaces may ignore or omit different types of storage block prefetching when the amount of network traffic between the branch and data center locations over the WAN 930 exceeds a threshold.

In an additional embodiment, a branch virtual storage array interface may utilize two or more WAN connections, such as WAN connections 931*a* and 931*b*, to segregate normal network traffic, such as internet access for clients and server systems 952, from storage block WAN traffic. In yet an additional embodiment, storage block WAN traffic may be further segregated into separate WAN connections for storage block requests from the storage client 939 and prefetched storage blocks to be cached in the virtual storage array cache 945.

Similarly, an embodiment of the data center virtual storage array interface may prioritize storage block accesses from different branch locations, different storage clients, different client and server systems, and/or to different LUNs in the physical storage array 903. In a further embodiment, the data center virtual storage array interface 907 may utilize two or more storage array network (SAN) connections, such as SAN connections 905*a* and 905*b*, to access one or more physical storage arrays. In this embodiment, different SAN connections may be used to access the physical storage array 903 or other storage devices for different branch locations, different storage clients, different client and server systems, and/or to access different LUNs. In yet a further embodiment, storage block SAN traffic may be further segregated into separate SAN connections 905*a* and 905*b* for storage block requests from the storage client 939 and prefetched storage blocks to be cached in the virtual storage array cache 945.

Figure 10:
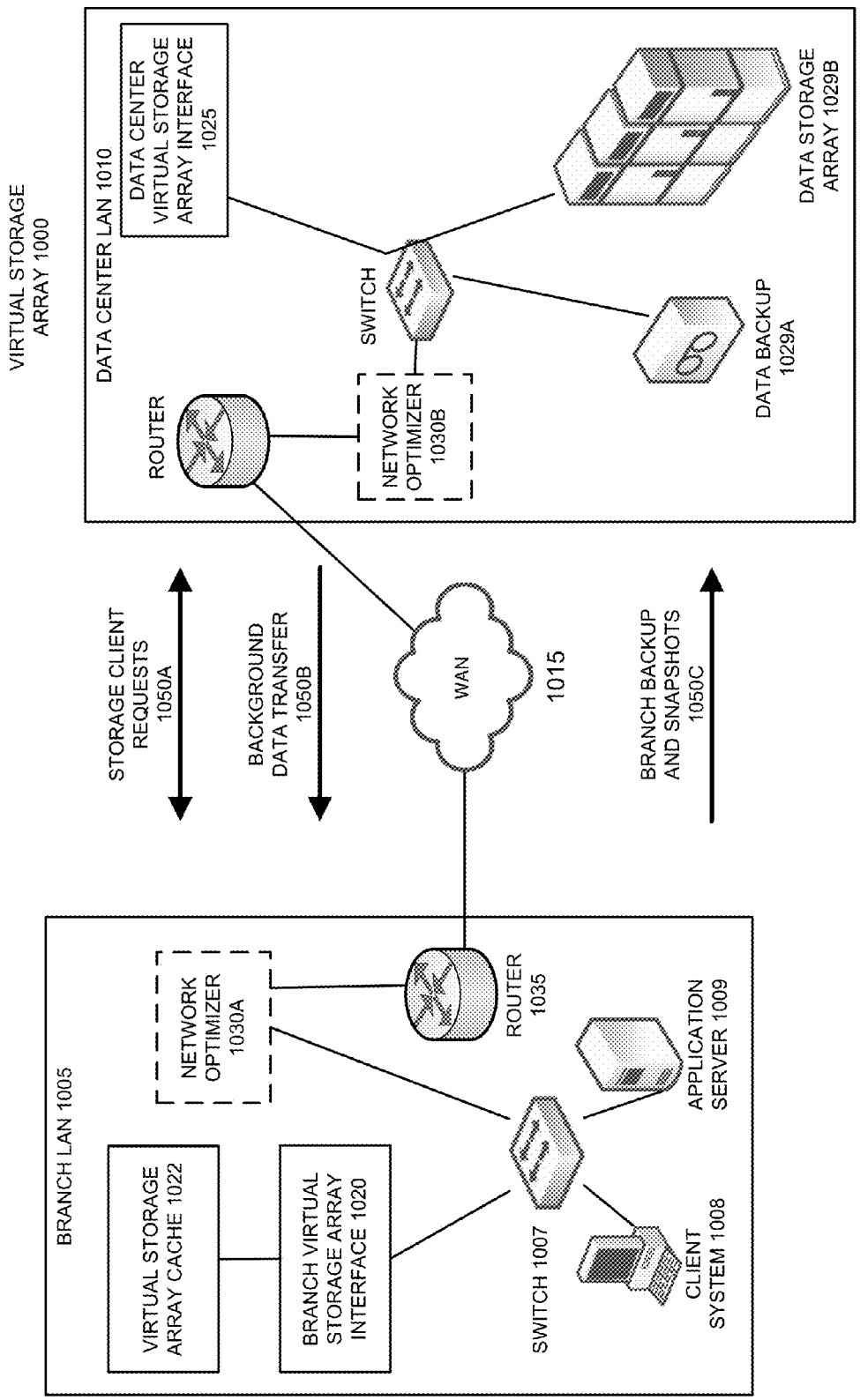
FIG. 10 illustrates a method of deploying large amounts of data to a branch location according to an embodiment of the invention.

In some applications, a large amount of data needs to be communicated from a data center to a branch location. For example, this can occur when a new branch location is opened. In this situation, it is desirable for users at the branch location to be able to begin work as soon as possible, rather than waiting for a data transfer from the data center to the branch location to be completed. FIG. 10 illustrates a method of deploying large amounts of data to a branch location according to an embodiment of the invention.

FIG. 10 illustrates an example virtual storage array system 1000. Example system 1000 includes a branch location LAN 1005 and a data center LAN 1010. The branch location and the data center location LANs 1005 and 1010 are connected by one or more wide area networks (WANs) 1015, such as the internet. Branch location LAN 1005 may include a switch 1007, router 1035, and other wired or wireless network devices for connecting client systems 1008 and application servers 1009 with the branch location 1005 LAN and the WAN 1015.

As described above, branch location LAN 1005 includes a branch location virtual storage array interface 1020. Additionally, the branch virtual storage array interface 120 is connected with a virtual storage array cache 1022, which is used to ameliorate the effects of the WAN 1015 on virtual storage array performance.

To support the branch location virtual storage array interface 1020, the data center LAN 1010 includes a data center virtual storage array interface 1025. The data center virtual storage array interface 1025 accesses physical data storage devices 1029 on a storage array network, including physical data storage array devices 1029*a* and data backup devices 1029*b*.

In a further embodiment, branch 105 and data center LANs 110 may optionally include network optimizers 1030*a* and 1030*b* for improving the performance of data communications over the WAN 1015 between branches and/or the data center.

In an embodiment, the branch virtual storage array interface 1020 is configured to reproduce a data set stored at the data center at the branch location 1005. The data set to be transferred may be all or a portion of a LUN associated with a virtual storage array. Following this configuration, the virtual storage array interfaces 1020 and/or 1025 begin servicing storage client requests. When a storage block requested by a client system 1008 or application server 1009 is not found in the virtual storage array cache 1022, the virtual storage array interfaces 1020 and 1025 retrieves the requested storage block via the WAN 1015 from the data center 1010 using one or more storage client requests 1050*a*. Storage client requests 1050*a* may include requests for one or more storage blocks requested by storage clients. Additionally, storage client requests 1050*a* may include storage blocks retrieved from the data center 1010 as part of a prefetching technique to hide the latency and bandwidth restrictions of the WAN 1015 from storage clients.

While the virtual storage array interfaces handle storage requests from storage clients and prefetch storage blocks, an embodiment of system 1000 also performs a background data transfer 1050b of the desired to the branch location 1005. In an embodiment, the background data transfer 1050b includes the portion of the data set associated with the virtual storage array that has not been previously requested by a storage client or prefetched by the virtual storage array interfaces. In an embodiment, the virtual storage array cache 1022 at the branch location 1005 has sufficient storage capacity to store the entire data set. In another embodiment, additional data storage at the branch location 1005 is used to store the data set. The background data transfer 1050b continues until the entire data set has been transferred and stored at the branch location 1005 using the storage client requests and storage block prefetching 1050a in conjunction with the background data transfer 1050b.

Once the data set has been copied to the branch location 1005, an embodiment of system 1000 enables client systems 1008, application servers 1009, or other storage clients at the branch location 1005 to access the data set from local storage. In a further embodiment, the branch virtual storage array interface 1020 communicates any changes to the data set at the branch location 1005 back to the data center 1010 for data backup. In still a further embodiment, the branch virtual storage array interface 1020 may perform data snapshots of the state of the data set. Backups and snapshots of the data set are communicated from the branch location 1005 to the data center 1010 via WAN 1015 using branch backup and snapshots communications 1050c. In an embodiment, the branch backup and snapshots communications 1050c includes only the changes to the data set at the branch location 1005. As described above, the branch backup and snapshot communications 1050c may be transferred over the WAN 1015 asynchronously and in the background to the normal operations of the virtual storage array interface.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of migrating a block storage device between network locations, the method comprising:
configuring a first block storage device interface at a first branch network location to access a first logical storage in a block storage device at a data center network location, wherein the data center network location is connected with the first branch network location via a wide area network;
providing block storage access to a first storage client at the first branch network location via the first block storage device interface by retrieving storage blocks from the first logical storage in the block storage device via the wide area network;
disabling the block storage access to the first storage client to prevent the first storage client from accessing the storage blocks from the first logical storage in the block storage device;
configuring a second block storage device interface at a second branch network location to access the first logical storage in the block storage device at the data center network location, wherein the data center network location is connected with the second branch network location via the wide area network;
providing block storage access to a second storage client at the second branch network location via the second block storage device interface by retrieving storage blocks from the first logical storage in the block storage device via the wide area network; and
wherein disabling the block storage access to the first storage client comprises:
suspending a first virtual machine executing at the first branch network location using virtual machine data stored in the first logical storage in the block storage device at the data center location, and
restarting the suspended first virtual machine at the second branch network location using the virtual machine data stored in the first logical storage in the block storage device at the data center location.

2. The method of claim 1, wherein disabling the block storage access to the first storage client comprises: identifying updated storage blocks in a first storage block cache at the branch network location; transferring the updated storage blocks from the first storage block cache to the first logical storage in the block storage device at the data center location via the wide area network; and storing the updated storage blocks in the first logical storage in the block storage device.

3. The method of claim 1, wherein disabling the block storage access to the first storage client is in response to a schedule.

4. The method of claim 1, comprising:
establishing a network connection between the first block storage device interface at the first branch location and the second block storage device interface at the second branch location via the wide area network;
configuring the first block storage device interface at a first branch network location to access the first logical storage through the second block storage device interface at the second network location; and
providing block storage access to the first storage client at the first branch network location via the first block storage device interface by retrieving storage blocks from the first logical storage in the block storage device with the second block storage device interface and communicating retrieved storage blocks from the second block storage device interface to the first block storage device interface.

5. A non-transitory computer-readable storage medium storing instructions that, when executed by a computer, cause the computer to perform a method of migrating a block storage device between network locations, the method comprising:
configuring a first block storage device interface at a first branch network location to access a first logical storage in a block storage device at a data center network location, wherein the data center network location is connected with the first branch network location via a wide area network;

providing block storage access to a first storage client at the first branch network location via the first block storage device interface by retrieving storage blocks from the first logical storage in the block storage device via the wide area network;

disabling the block storage access to the first storage client to prevent the first storage client from accessing the storage blocks from the first logical storage in the block storage device;

configuring a second block storage device interface at a second branch network location to access the first logical storage in the block storage device at the data center network location, wherein the data center network location is connected with the second branch network location via the wide area network;

providing block storage access to a second storage client at the second branch network location via the second block storage device interface by retrieving storage blocks from the first logical storage in the block storage device via the wide area network; and wherein disabling the block storage access to the first storage client comprises:

suspending a first virtual machine executing at the first branch network location using virtual machine data stored in the first logical storage in the block storage device at the data center location, and restarting the suspended first virtual machine at the second branch network location using the virtual machine data stored in the first logical storage in the block storage device at the data center location.

6. The non-transitory computer-readable storage medium of claim 5, wherein disabling the block storage access to the first storage client comprises:

identifying updated storage blocks in a first storage block cache at the branch network location; transferring the updated storage blocks from the first storage block cache to the first logical storage in the block storage device at the data center location via the wide area network; and storing the updated storage blocks in the first logical storage in the block storage device.

7. The non-transitory computer-readable storage medium of claim 5, wherein disabling the block storage access to the first storage client is in response to a schedule.

8. The non-transitory computer-readable storage medium of claim 5, comprising:

establishing a network connection between the first block storage device interface at the first branch location and the second block storage device interface at the second branch location via the wide area network;

configuring the first block storage device interface at a first branch network location to access the first logical storage through the second block storage device interface at the second network location; and providing block storage access to the first storage client at the first branch network location via the first block storage device interface by retrieving storage blocks from the first logical storage in the block storage device with the second block storage device interface and communicating retrieved storage blocks from the second block storage device interface to the first block storage device interface.

9. An apparatus, comprising:

a processor; and a storage medium storing instructions that, when executed by the processor, cause the apparatus to perform a method of migrating a block storage device between network locations, the method comprising:

configuring a first block storage device interface at a first branch network location to access a first logical storage in a block storage device at a data center network location, wherein the data center network location is connected with the first branch network location via a wide area network;

providing block storage access to a first storage client at the first branch network location via the first block storage device interface by retrieving storage blocks from the first logical storage in the block storage device via the wide area network;

disabling the block storage access to the first storage client to prevent the first storage client from accessing the storage blocks from the first logical storage in the block storage device;

configuring a second block storage device interface at a second branch network location to access the first logical storage in the block storage device at the data center network location, wherein the data center network location is connected with the second branch network location via the wide area network;

providing block storage access to a second storage client at the second branch network location via the second block storage device interface by retrieving storage blocks from the first logical storage in the block storage device via the wide area network; and wherein disabling the block storage access to the first storage client comprises:

suspending a first virtual machine executing at the first branch network location using virtual machine data stored in the first logical storage in the block storage device at the data center location, and restarting the suspended first virtual machine at the second branch network location using the virtual machine data stored in the first logical storage in the block storage device at the data center location.

10. The apparatus of claim 9, wherein disabling the block storage access to the first storage client comprises: identifying updated storage blocks in a first storage block cache at the branch network location;

transferring the updated storage blocks from the first storage block cache to the first logical storage in the block storage device at the data center location via the wide area network; and storing the updated storage blocks in the first logical storage in the block storage device.

11. The apparatus of claim 9, wherein disabling the block storage access to the first storage client is in response to a schedule.

12. The apparatus of claim 9, comprising:

establishing a network connection between the first block storage device interface at the first branch location and the second block storage device interface at the second branch location via the wide area network;

configuring the first block storage device interface at a first branch network location to access the first logical storage through the second block storage device interface at the second network location; and providing block storage access to the first storage client at the first branch network location via the first block storage device interface by retrieving storage blocks from the first logical storage in the block storage device with the second block storage device interface and communicating retrieved storage blocks from the second block storage device interface to the first block storage device interface.

* * * * *